(12) United States Patent
Sharp et al.

(10) Patent No.: US 8,851,680 B2
(45) Date of Patent: Oct. 7, 2014

(54) POLARIZATION COMPENSATED STEREOSCOPIC SYSTEMS

(75) Inventors: Gary D. Sharp, Boulder, CO (US); David A. Coleman, Louisville, CO (US); Jianmin Chen, Louisville, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 13/471,224

(22) Filed: May 14, 2012

(65) Prior Publication Data

US 2012/0287360 A1 Nov. 15, 2012

Related U.S. Application Data

(60) Provisional application No. 61/485,497, filed on May 12, 2011.

(51) Int. Cl.
*G03B 35/20* (2006.01)

(52) U.S. Cl.
USPC .......................................... 353/8; 359/489.14

(58) Field of Classification Search
USPC ....................... 359/489; 264/1.32; 353/8, 121
See application file for complete search history.

(56) References Cited

U.S. PATENT DOCUMENTS

| | | | |
|---|---|---|---|
| 7,898,734 B2 | 3/2011 | Coleman et al. | |
| 2006/0285042 A1 | 12/2006 | Chen et al. | |
| 2007/0132953 A1 | 6/2007 | Silverstein | |
| 2010/0177175 A1 | 7/2010 | Chen et al. | |
| 2011/0096295 A1 | 4/2011 | Cowan et al. | |

OTHER PUBLICATIONS

Robinson et al., "Polarization Engineering for LCD Projection" (Jul. 2005).
File History of U.S. Appl. No. 13/182,381 to Sharp filed Jul. 13, 2011.
Born and Wolf, Principles of Optics: Electromagnetic Theory of Propagation, Interference and Diffraction of Light (1999).
File History of U.S. Appl. No. 13/010,755 to Schuck filed Jan. 20, 2011.
International search report and written opinion of international searching authority in PCT/US12/37819 dated Nov. 29, 2012.

*Primary Examiner* — Francis M Legasse, Jr.
*Assistant Examiner* — Jerry Brooks
(74) *Attorney, Agent, or Firm* — Neil G. J. Mothew; Darlene K. Kondo

(57) ABSTRACT

Disclosed embodiments include stereoscopic systems having at least one compensator operable to reduce the sensitivity of polarization control over incidence angle of image source optics and analyzer optics. In an exemplary embodiment, the disclosed compensator is operable to compensate polarization changes induced by optics at either or both the image source subsystem and the analyzer subsystem, in which the polarization changes would be operable to cause leakage at the analyzer subsystem if uncompensated. As such, the disclosed compensators and compensation techniques are operable to reduce leakage at the analyzer subsystem even if the disclosed compensator may be located at the analyzer subsystem.

18 Claims, 17 Drawing Sheets

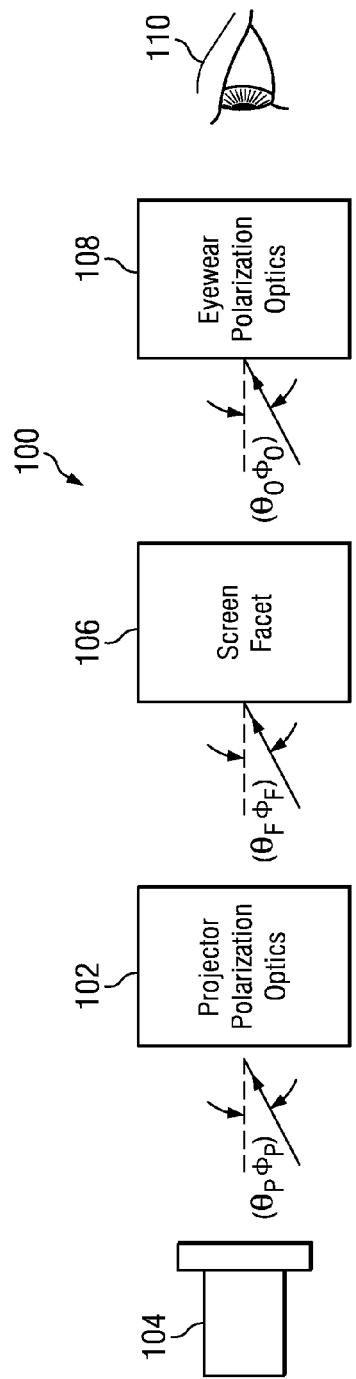
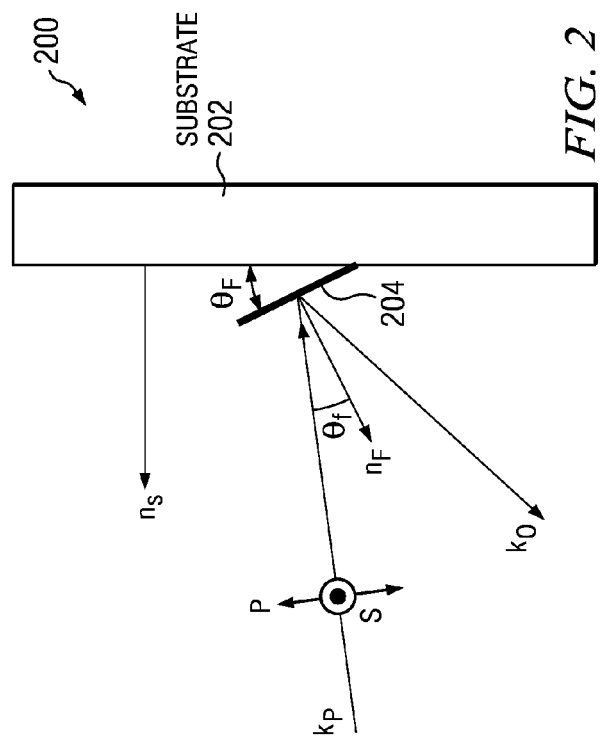

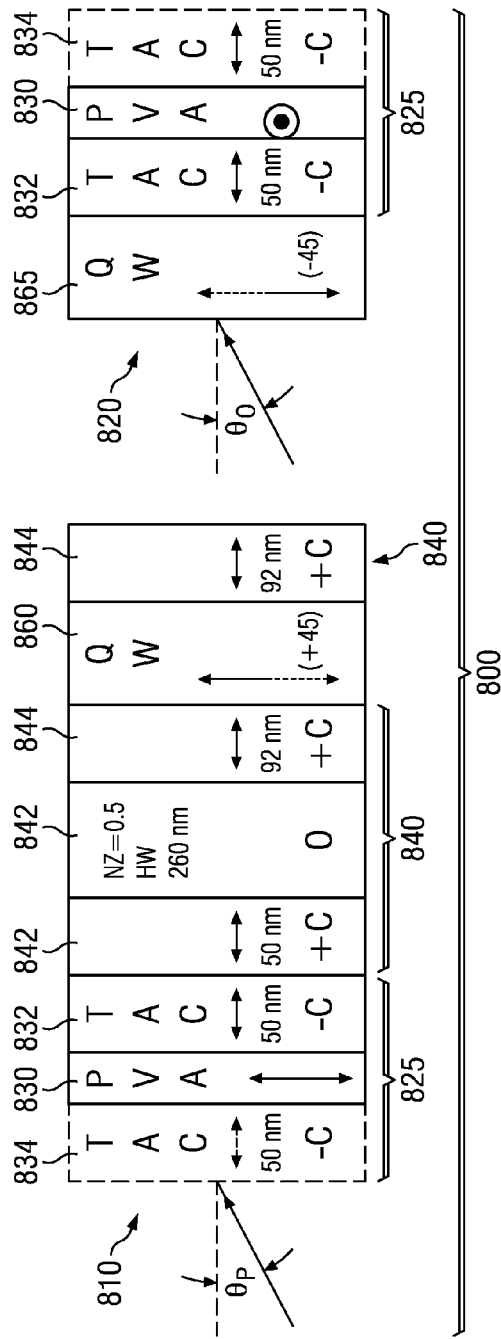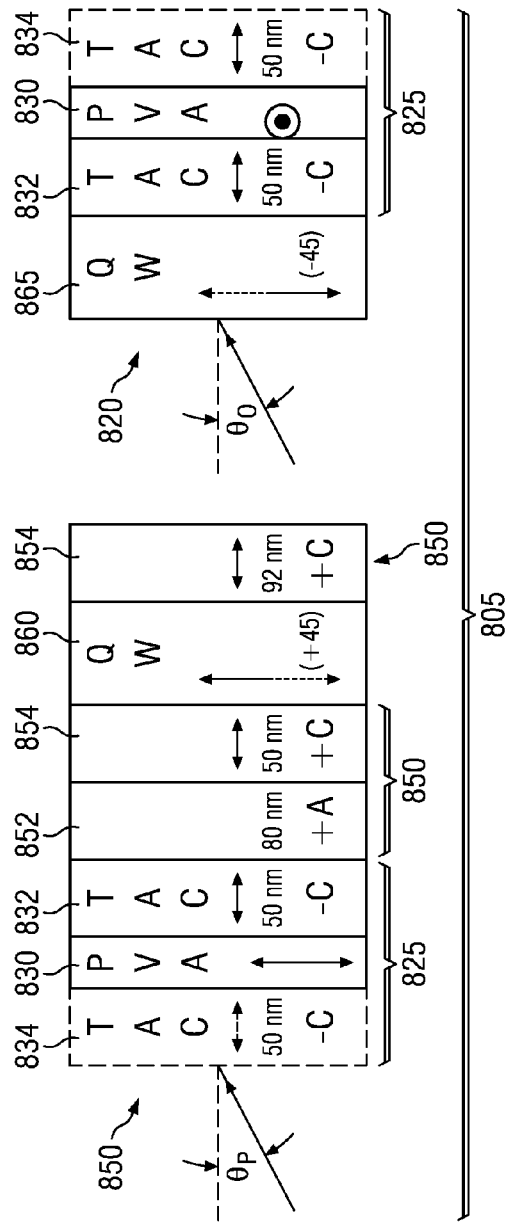

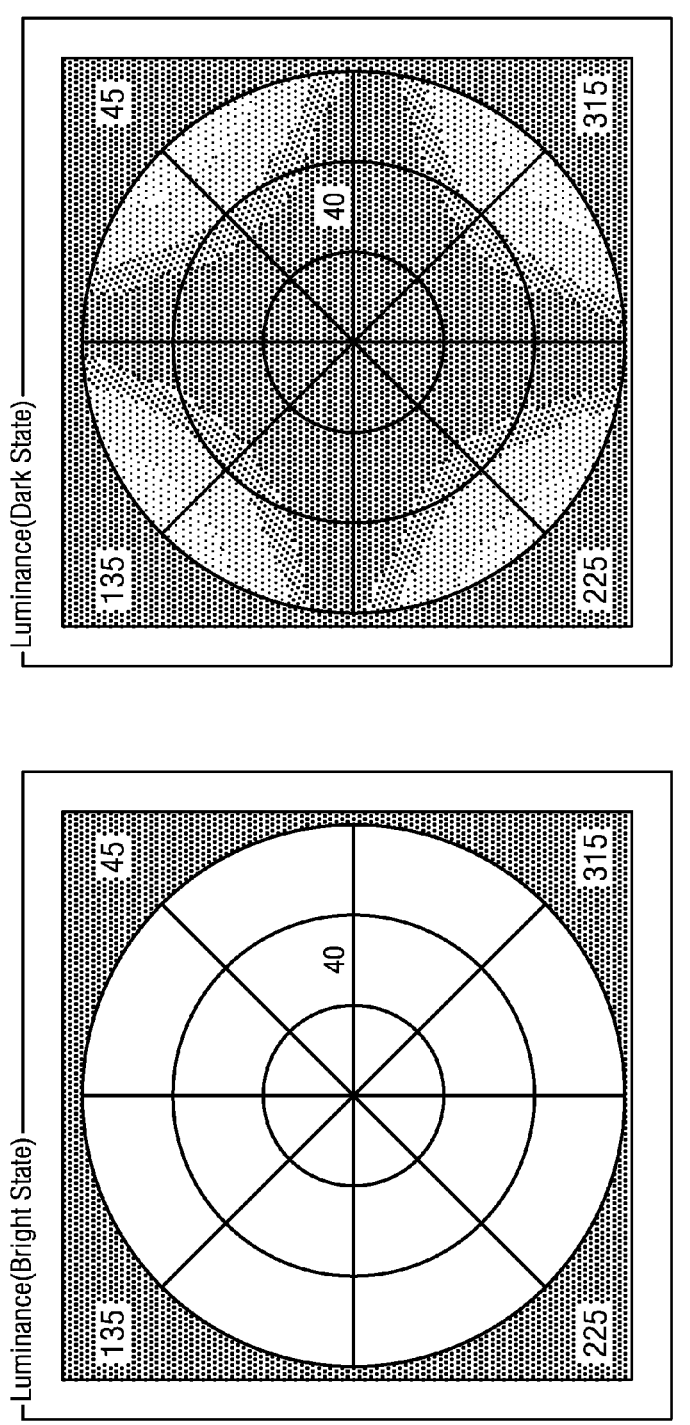
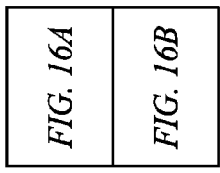
FIG. 16 ered herein by reference for all purposes. Pursuant to 37 CFR 1.7(b), this application is hereby filed on Monday, May 14, 2012, which is the next succeeding business day following the one year anniversary of the filing of Provisional Patent Application No. 61/485,497.

TECHNICAL FIELD

The present disclosure generally relates to polarization-based stereoscopic systems, and more particularly, compensated polarization-based stereoscopic systems.

BACKGROUND

Stereoscopic systems operate by presenting two distinct images to a viewer, a first image being presented to the right eye and a second image being presented to the left eye. Polarization or spectral-division methods may be used to separate the two images. The right-eye and left-eye images may be coded with orthogonal polarizations at an image source, and viewer polarization optics may allow light of orthogonal polarization states to be passed onto different eyes, thereby creating the perception of 3D images.

BRIEF SUMMARY

A first disclosed exemplary embodiment is directed to a stereoscopic imaging system comprising an imager subsystem operable to output light of first and second states of polarization (SOP) and an analyzer subsystem operable to substantially block light of the first SOP from traveling along a first path and to substantially block light of the second SOP from traveling along a second path. In an embodiment, the image source subsystem comprises a first optical element operable to cause a first polarization change on light passing therethrough, and the analyzer subsystem comprises a second optical element operable to cause a second polarization change, and the first and second polarization changes, if not compensated, would at least partially cause at least one of a leakage of light of the first SOP along the first path or a leakage of light of the second SOP along the second path. Either the image source subsystem or the analyzer subsystem comprises a compensator configured to at least reduce both the first and second polarization changes.

Another exemplary embodiment of the present disclosure is directed to a stereoscopic projector system comprising a projection subsystem operable to output light of first and second SOPs, and an analyzer subsystem operable to substantially block light of the first SOP from traveling along a first path and to substantially block light of the second SOP from traveling along a second path. The projector subsystem comprises a first optical element operable to cause a first polarization change on light passing therethrough, and the analyzer subsystem comprises a second optical element operable to cause a second polarization change, and the first and second polarization changes, if not compensated, would at least partially cause at least one of a leakage of light of the first SOP along the first path or a leakage of light of the second SOP along the second path. The projector subsystem comprises a compensator configured to at least reduce both the first and second polarization changes.

Yet another exemplary embodiment is directed to a stereoscopic display system comprising an image source subsystem operable to output light of first and second SOPs. The image source subsystem comprises an LCD panel, an exit polarizer optically following the LCD panel, and a stripe patterned quarter wave plate (QWP) aligned with the LCD panel. The stereoscopic display system further comprises an analyzer subsystem operable to substantially block light of the first SOP from traveling along a first path and to substantially block light of the second SOP from traveling along a second path, the analyzer subsystem comprising analyzing quarter wave plates and polarizers each being operable to receive light from one of the analyzing quarter wave plates. A first +C-plate is either disposed in the image source subsystem between the exit polarizer and the stripe patterned QWP or disposed in the analyzer subsystem optically following one of the analyzing quarter wave plates.

BRIEF DESCRIPTION OF THE DRAWINGS

FIG. 1 illustrates a schematic diagram of an exemplary model of a polarization-based stereoscopic projection system, in accordance with the present disclosure;

FIG. 2 illustrates a schematic diagram of a "facet model" for a screen, in accordance with the present disclosure;

FIG. 8A illustrates a schematic diagram of a first exemplary compensated circular stereoscopic system, in accordance with the present disclosure;

FIG. 8B illustrates a schematic diagram of a second exemplary compensated circular stereoscopic system, in accordance with the present disclosure;

POLARIZATION COMPENSATED STEREOSCOPIC SYSTEMS

CROSS-REFERENCE TO RELATED APPLICATION

Figure 12:
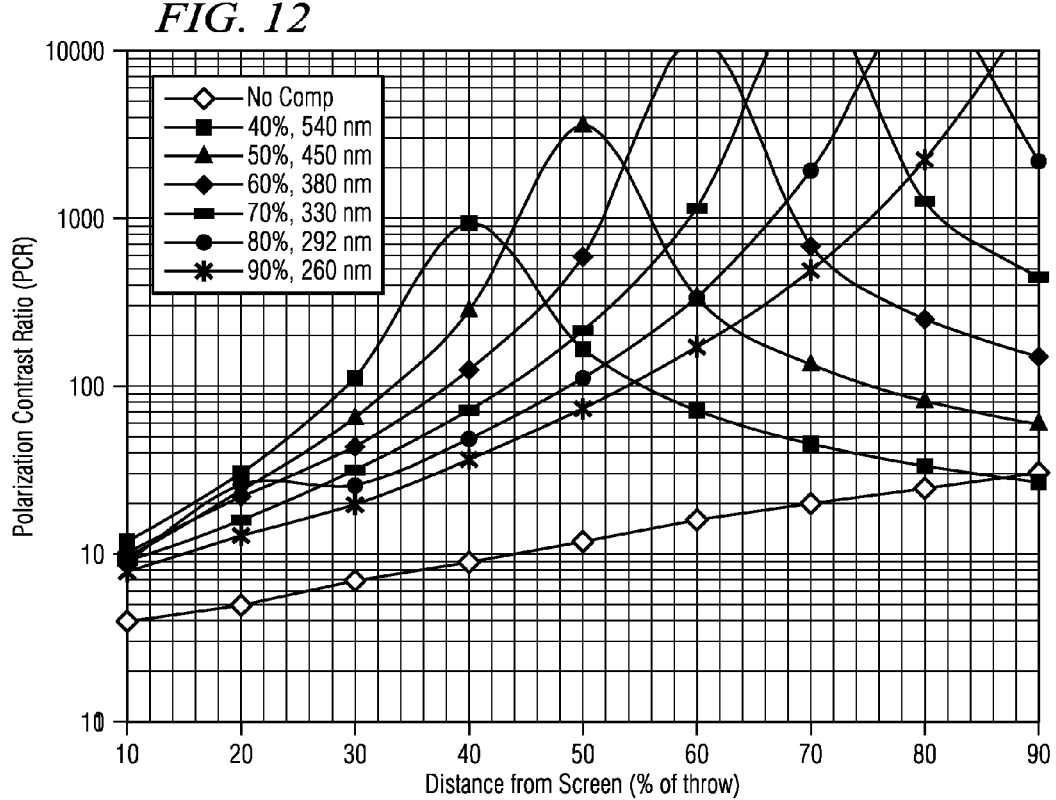
Figure 13:
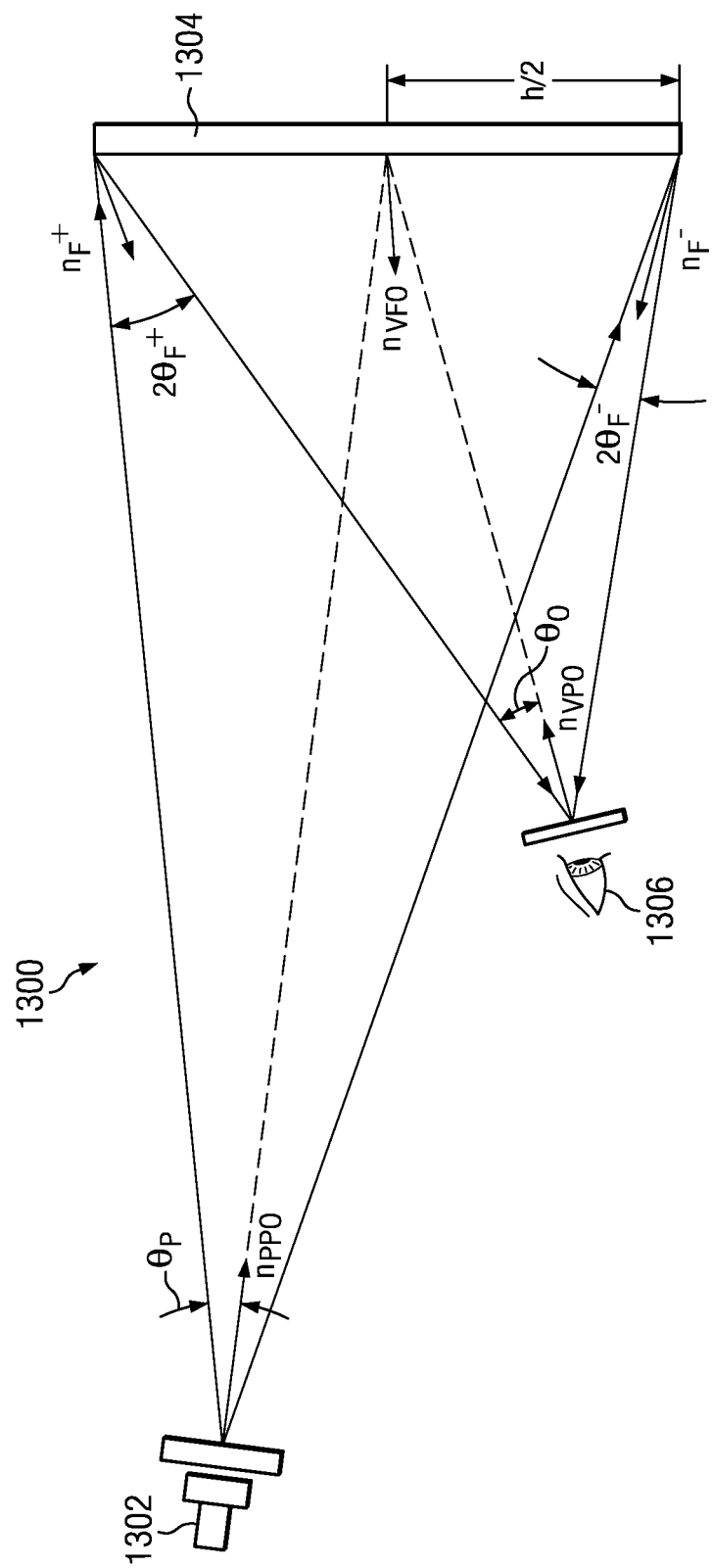
Figure 14:
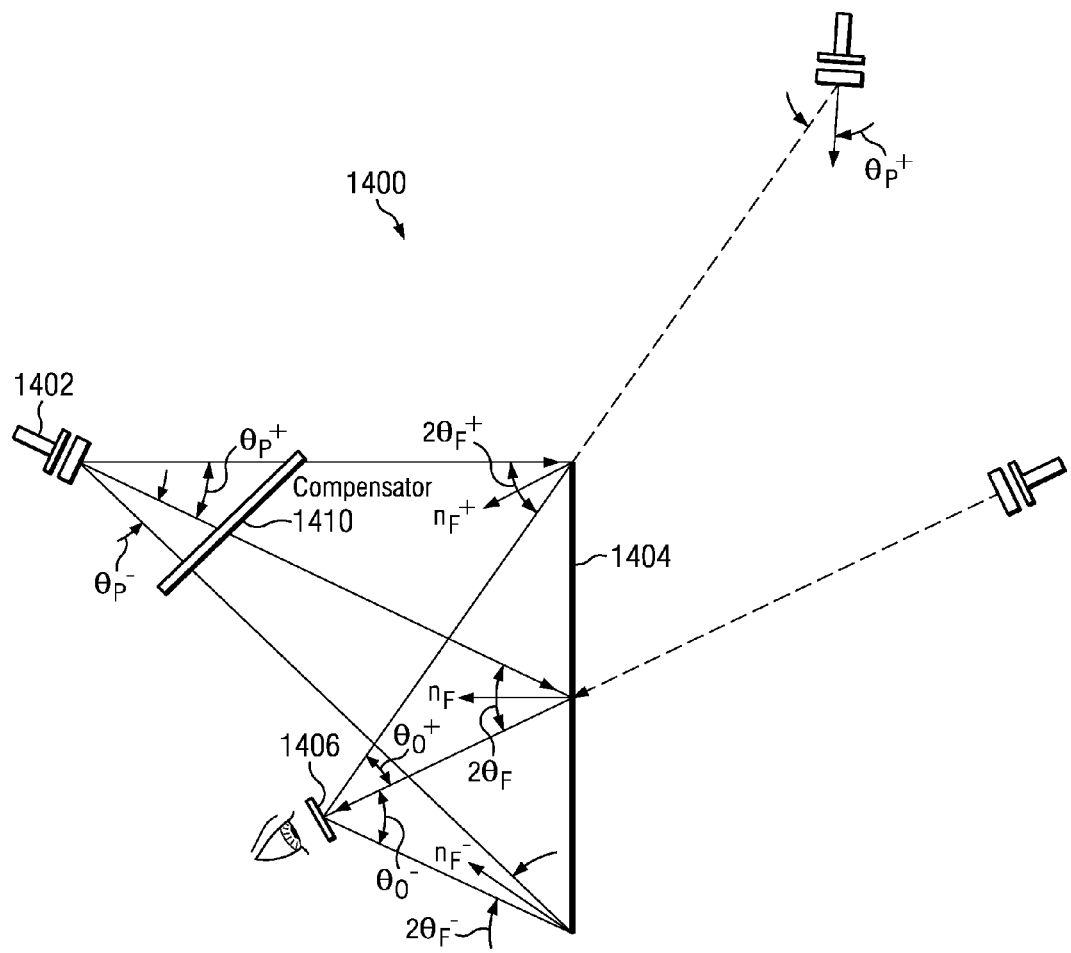
Figure 15:
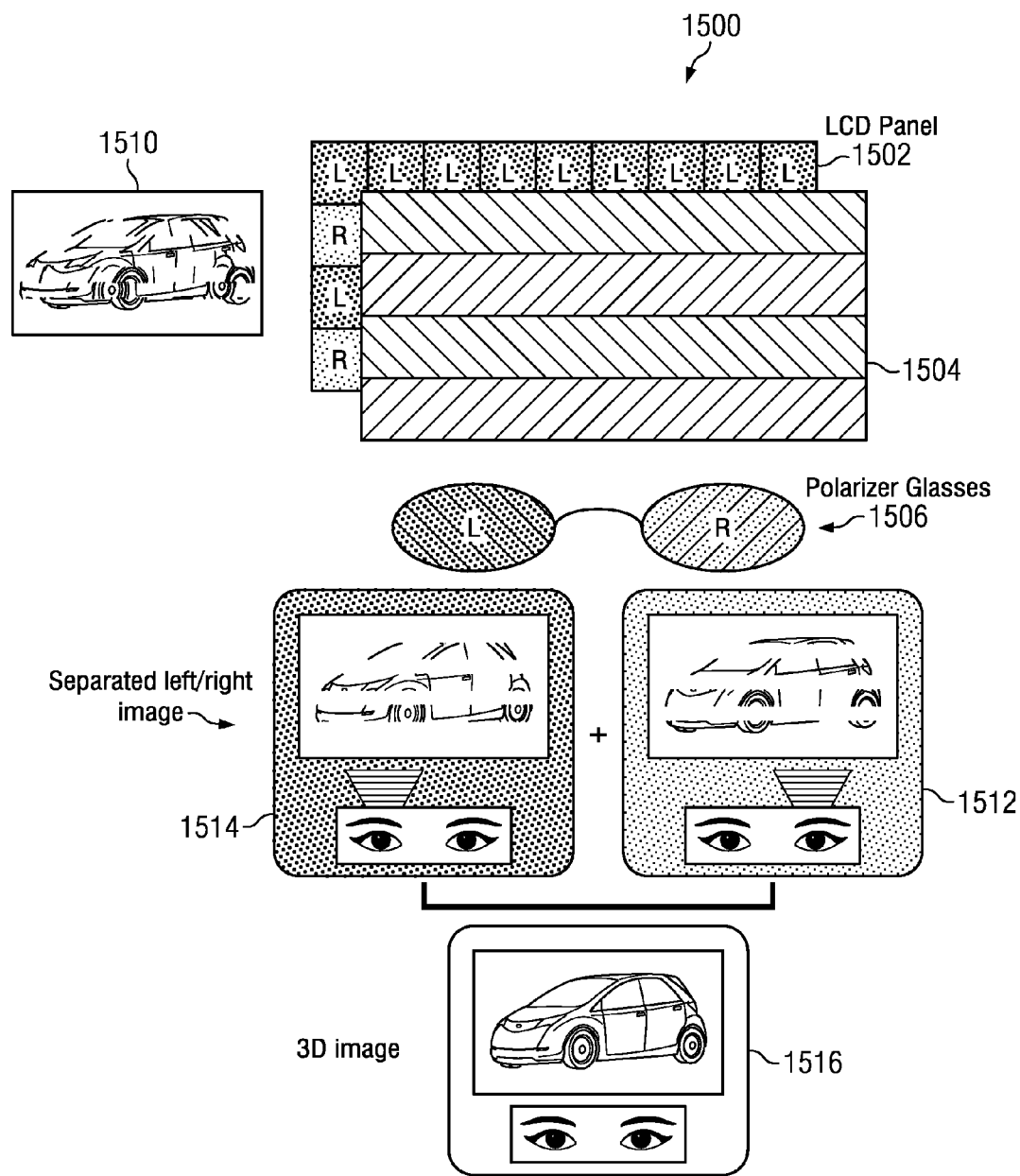
Figure 16B:
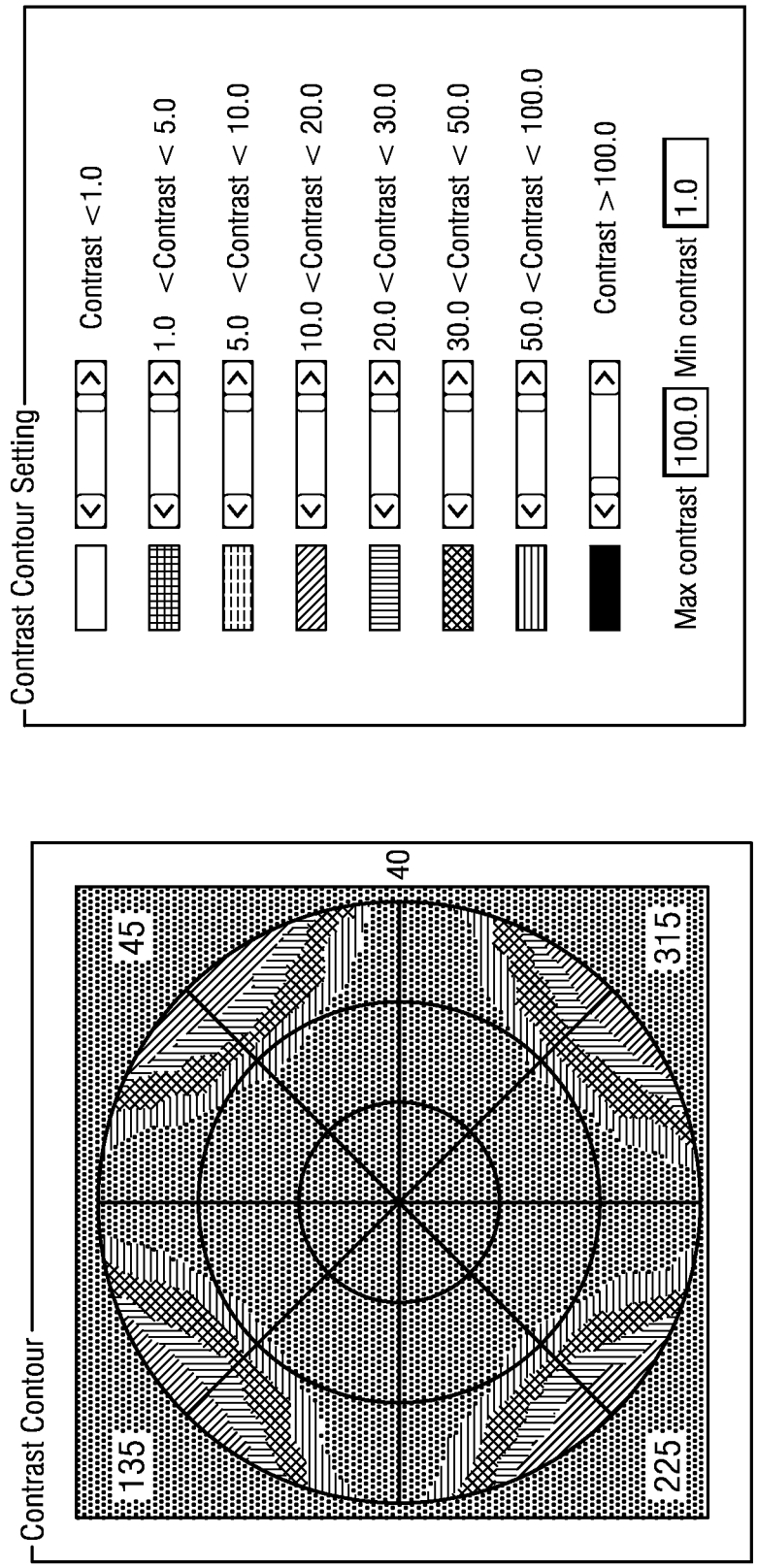
Figure 17:
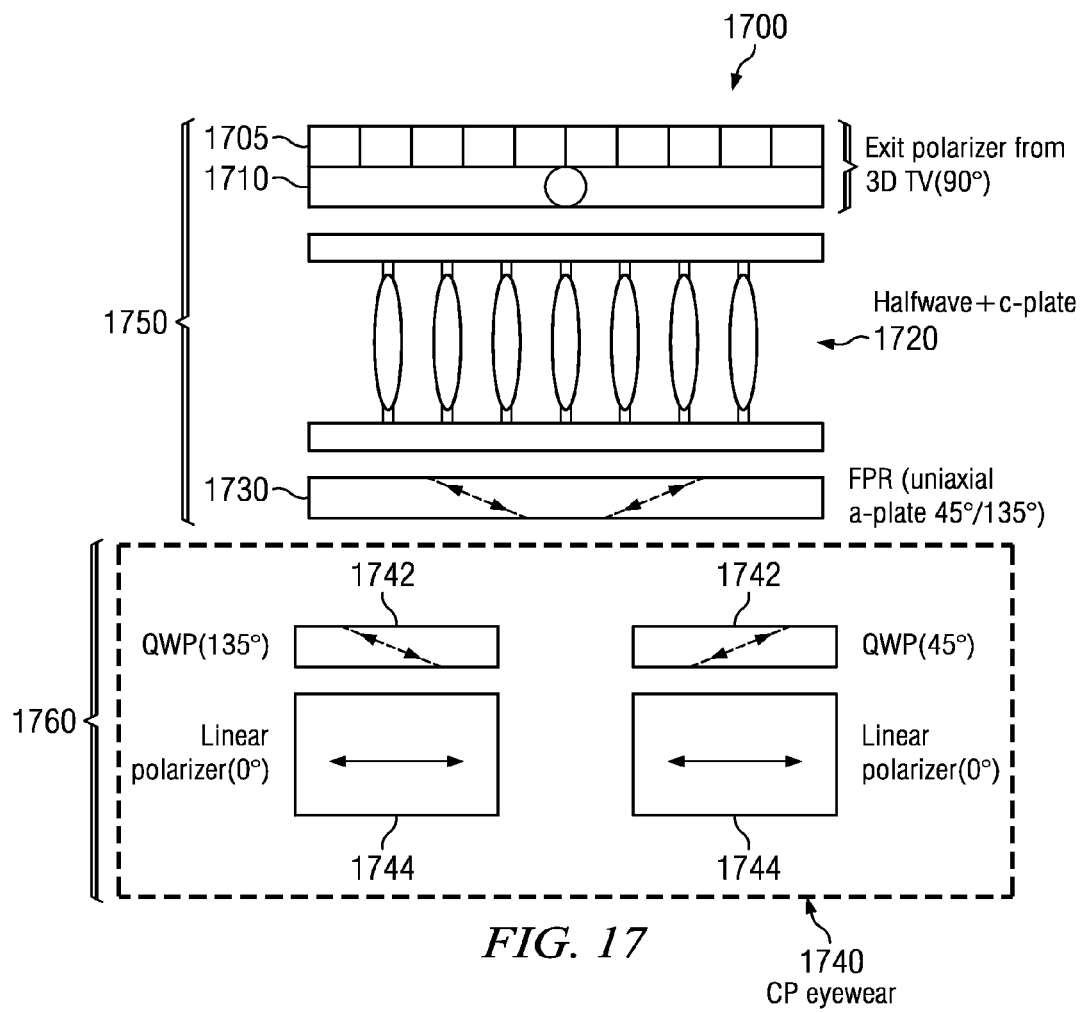
Figure 18:
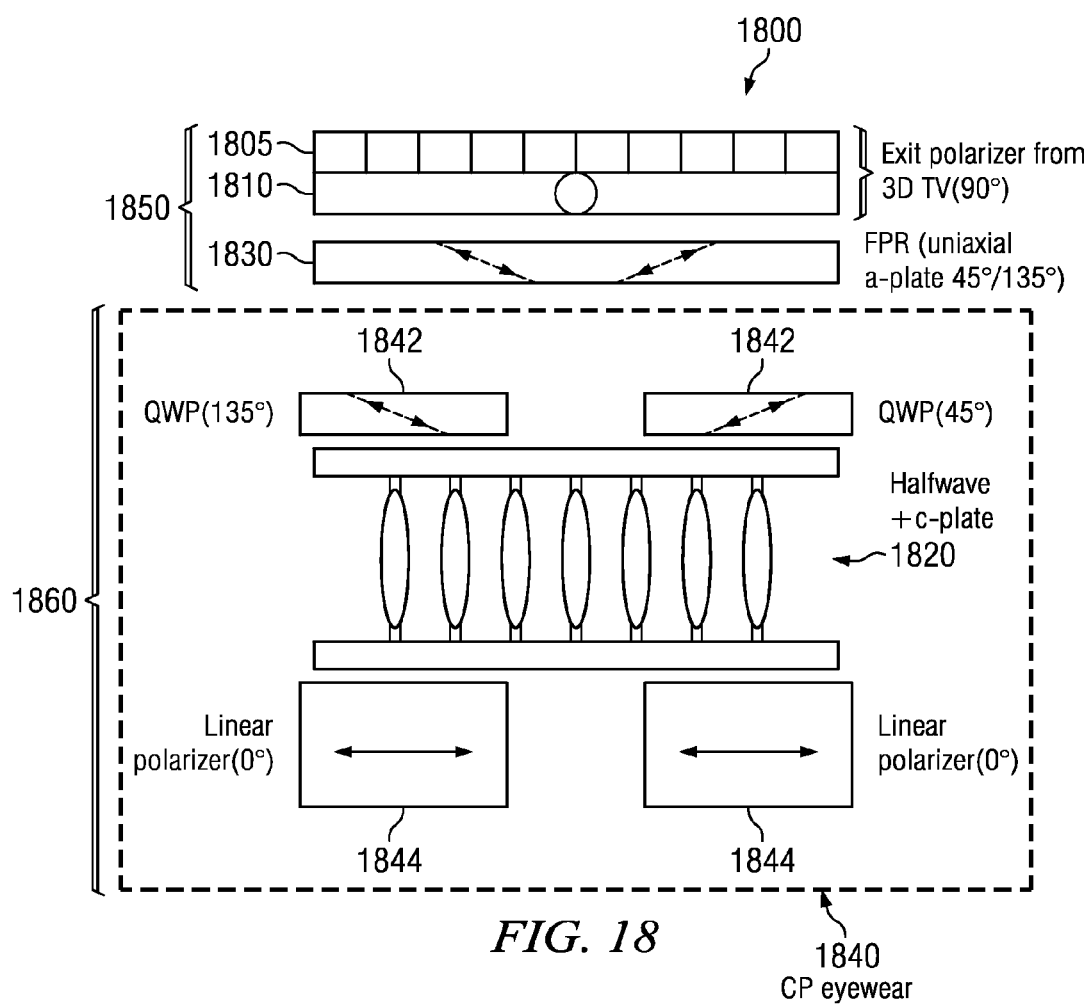
Figure 19:
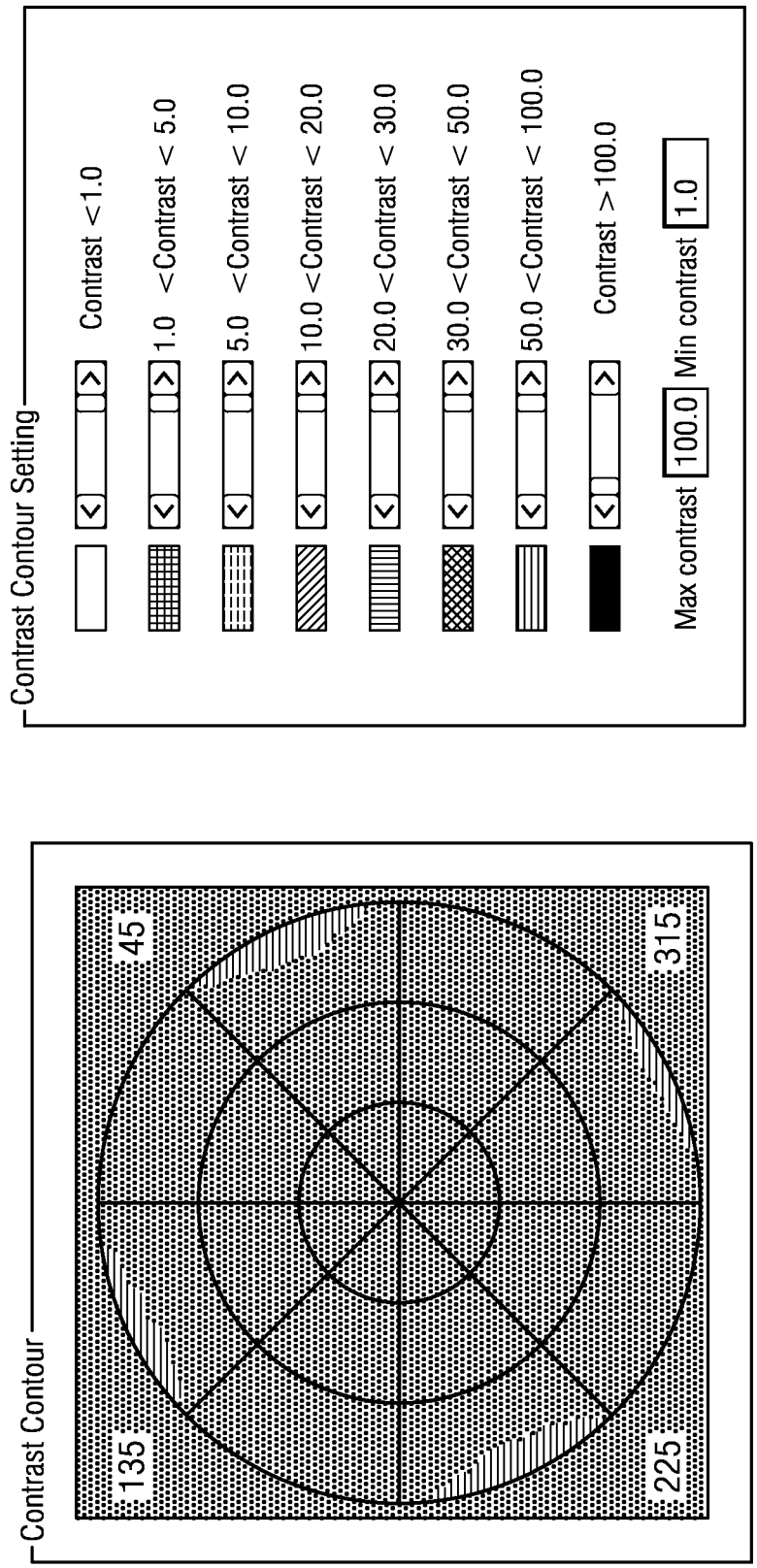
Figure 20A:
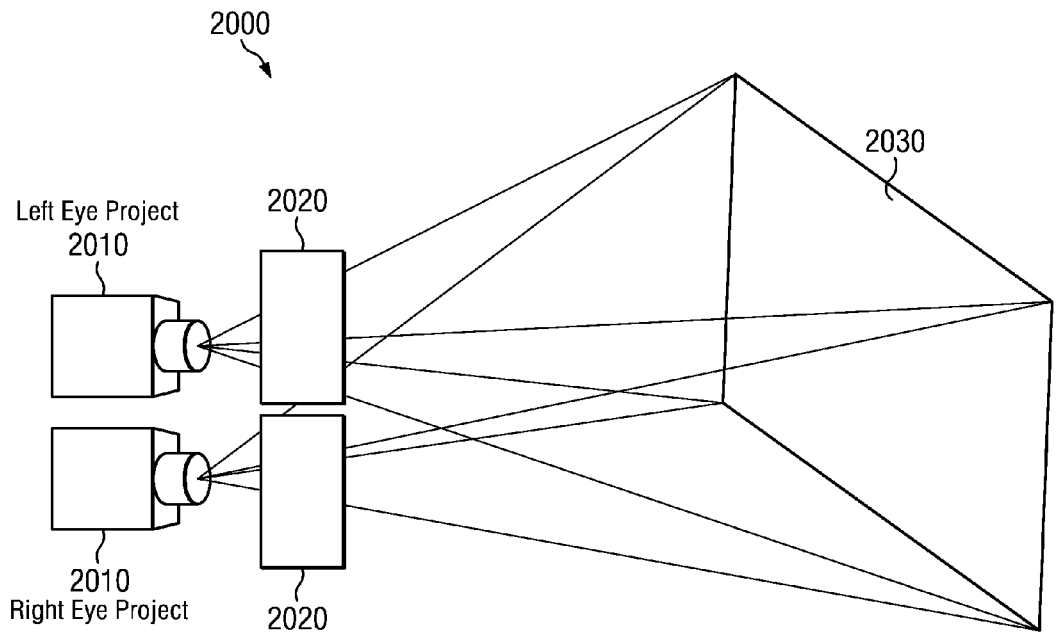
Figure 20B:
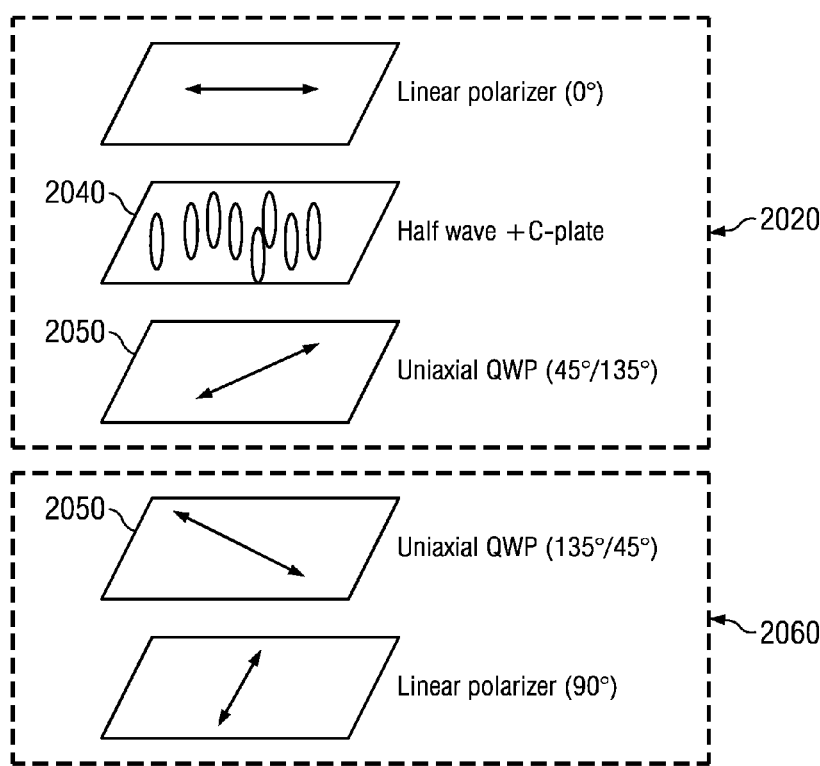

This application relates and claims priority to commonly-assigned U.S. Provisional Patent Application No. 61/485,497, filed May 12, 2011, and entitled "Polarization compensated stereoscopic projection," which is incorporated FIG. 12 illustrates a chart of a comparison of contrast ratios to projection angles for various minimum PCR value in a circular stereoscopic system, in accordance with the present disc;

FIG. 13 illustrates a schematic side view of a stereoscopic system configuration having vertical offset on the incidence angles, in accordance with the present disclosure;

FIG. 14 illustrates a schematic diagram of a stereoscopic system compensated for vertical offset, in accordance with the present disclosure;

FIG. 15 illustrates a schematic diagram of an exemplary film patterned retarder (FPR) system, in accordance with the present disclosure;

FIG. 16 illustrates a polar plot of the contrast ratio for an exemplary FPR system, in accordance with the present disclosure;

FIG. 17 illustrates a schematic diagram of a first exemplary compensated FPR stereoscopic system, in accordance with the present disclosure;

FIG. 18 illustrates a schematic diagram of a second exemplary compensated FPR stereoscopic system, in accordance with the present disclosure;

FIG. 19 illustrates a polar plot of the contrast ratio for an exemplary compensated FPR system, in accordance with the present disclosure;

FIG. 20A illustrates a schematic diagram of an exemplary dual-projection stereoscopic system, in accordance with the present disclosure; and FIG. 20B illustrates a schematic diagram of an exemplary compensated dual-projection stereoscopic system, in accordance with the present disclosure.

DETAILED DESCRIPTION

FIG. 1 is a schematic diagram illustrating an exemplary model of a polarization-based stereoscopic projection system 100. The performance of the polarization-based stereoscopic projection system 100 may be determined by three elements: 1) polarization optics 102 at the projector 104; 2) action of the polarization preserving screen 106; and 3) polarization optics 108 at the viewer 110. A simplified layout of these structures is illustrated in FIG. 1, where the incidence angle relative to normal, $\theta$, and azimuth angle, $\phi$, may be different on each structure.

The viewing experience provided by the system 100 may be compromised by numerous performance-affecting factors, but compensation through the adjustment and/or addition of polarization optical components to account for performance-affecting factors may mitigate or even eliminate the negative impact on viewing experience. Some metrics used to assess performance include polarization contrast ratio (PCR) associated with 3D cross-talk, overall light efficiency, brightness uniformity, overall color shift, and color uniformity. PCR is a sensitive indicator of polarization fidelity, and is calculated as the ratio of (photopically weighted white) power transmitted through a lens to the intended eye, to that leaking through the lens intended for the other eye.

Exemplary embodiments of the present disclosure are provided to illustrate exemplary approaches that may allow for optimum performance, even when extremely aggressive projection and viewing angles are involved. It is to be appreciated that some embodiments of the present disclosure may refer to particular illustrated projection or display systems, the exemplary compensation approaches disclosed herein may be suitable for improving the performance of any polarization based 3D system, including but not limited to single projector sequential (e.g., DLP), single projector spatial (e.g., SONY SXRD), dual projector, dual engine systems, and 3D displays, such as film patterned retarder (FPR) systems. In some embodiment, compensation may be accomplished at the projector or the display to allow for a single compensating structure that optimizes the experience for the viewing audience. This approach may allow for the benefit of realizing a relatively sophisticated compensation structure without adding significant cost to the system and operating cost. Embodiments of the present disclosure include cinema systems, where inexpensive disposable 3D glasses are distributed to customers. Some embodiments may include compensation structures at the projector that can correct deterministic polarization errors that exist throughout the system, including the projector, the screen, the eyewear, and even the geometry of the projection system.

In other embodiments where eyewear cost is not as critical, compensation can exist at both the projector and viewer to more precisely compensate polarization errors. Certain portable front-projection systems involve very short throw-ratio (ratio of screen distance to screen width), multiple broadly distributed viewers, and short viewing distances. Unlike the cinema, a portable projector can be located below all viewers, and can be closer to the screen than any viewers. Without such compensation, the quality of the 3D experience may be unacceptable.

According to the present disclosure, compensation configurations may involve adjustment in existing projector polarization optics and/or the addition of retarder elements. These elements can take many forms, including stretched polymer films, as-cast polymer films with intrinsic birefringence, liquid crystal cells, cross-linkable liquid crystal polymers, bulk crystals, and the like. Retarder elements used to compensate polarization based 3D systems in accordance with the disclosed principles are generally described in the following terms:

a. +A-Plate, −A-Plate: These are uniaxial linear retarders with optic axis in-plane, with positive and negative anisotropy, respectively.

b. +C-Plate, −C-Plate: These are uniaxial linear retarders with optic axis normal to the plane of the element, with positive and negative anisotropy, respectively.

c. Biaxial Retarder. This may include specific Nz values (ratio of thickness direction retardation to in-plane retardation) as needed for a specific compensation requirement.

d. O-Plate: In principle this is any retarder that has oblique orientation of the retarder axes. In many instances this is accomplished by tipping the retarder to create an asymmetry.

Compensators are generally described in Robinson et al., "Polarization Engineering for LCD Projection" (July 2005), which is herein incorporated by reference in its entirety. It is to be appreciated that any reference to a compensator in the present disclosure may be a reference to any of the above described elements for compensation, either acting alone or in any combination thereof, whether directed or indirectly connected. A reference to a compensator in the present disclosure may also be a reference to elements for compensation known in the art but not described herein.

Referring back to FIG. 1, factors that may produce a deterministic polarization change in the projection system 100 may include 1. Sensitivity of projector polarization optics (PPO) 102 and viewer polarization optics (VPO) 108 to incidence angle and azimuth angle.

2. Sensitivity of screen 106 to incidence angle.

3. Differential incidence angle between the projection vector (not shown) and viewing vector (not shown) produced by the projection screen 106.
4. Vertical offset, resulting from height difference between projector 104 and viewer 110.
5. Horizontal offset, resulting from displacement of the viewer 110 from the plane containing the projector 104 and the center of the screen 106.

These factors can be evaluated via polarization ray tracing, and are distinguished from random scatter events, such as haze from optical components, pseudo-depolarization from multiple reflection events from the screen 106, or scatter from sub-wavelength structures associated with the screen 106. It will be considered here that random scatter is uncorrelated with the above and can be added incoherently to power calculations, and power ratio calculations such as PCR.

Various elements for the PPO 102 and VPO 108 may be sensitive to incidence angle, including linear polarizers, retardation films, and liquid crystal devices. Even substrates and coatings may induce unintended polarization change. The polarization change may be a shift in a desired retardation value, an undesired change in the relative power projected onto the eigen-polarizations (or change in amplitude splitting) of an anisotropic element, or a shift in the transmission associated with eigen-polarizations (e.g., dichroism or diattenuation). Generally, a goal of compensation may be to optimize contrast for normally incident light, while mitigating the effects of polarization change for other angles of incidence. Optimization may be based on a layout of optical components that assumes a common incidence angle through the elements, including the encoding optics at the projector and the decoding optics at the viewer. To the extent that the PPO 102 and VPO 108 track each other in polar angle sensitivity, performance can in principle be maintained. Under these circumstances, optimum compensation solutions for polarization change due to sensitivity of the PPO 102 and VPO 108 above can be determined, as described in the commonly-owned U.S. patent application Ser. No. 13/182,381, which is herein incorporated by reference.

FIG. 2 illustrates a schematic diagram showing a "facet model" for a screen 200, which may be similar to screen 106 shown in FIG. 1. As discussed above, polarization change may be induced from the reflection associated with the projection screen 200. For simplicity, the angle sensitivity of the screen 200 is described here in terms of the illustrated "facet model." Rays incident on a polarization preserving screen surface may (ideally) be local specular reflections, as shown in FIG. 2. From the standpoint of preserving polarization, these specular reflections may ideally be single events which redirect a particular projection ray to a viewer, as shown.

According to the facet model, the local interaction of light with the screen 200 represents a mirror reflection from a planar surface (e.g., metallic surface), as illustrated in FIG. 2. The screen surface can be considered a statistical distribution of discrete facets 204 deposited on a substrate 202. FIG. 2 shows one of these facets 204, inclined with normal vector $n_f$, forming an angle $\theta_s$ with respect to the local substrate normal $n_s$. Light from the projector probes the surface for facets that redirect the incoming vector KP, to a particular observation direction, along vector KO. The angle between these vectors is $2\theta_f$, where $\theta_f$ is the facet incidence angle. The plane containing these vectors is the local plane of incidence.

Like any mirror, the facet 204 has linear eigen-polarizations, such that the local P polarization is in the plane of incidence, and the local S polarization is normal to both P and the facet normal vector. Fresnel describes the complex reflection of S and P polarizations from dielectric interfaces, with more specific analysis for reflection from metals (such as Aluminum) described in, for example, Born and Wolf, *Principles of Optics: Electromagnetic Theory of Propagation, Interference and Diffraction of Light* (1999), which is incorporated by reference herein. In general, the reflection produces differences in magnitude, which can be described in terms of a diattenuation. A difference in phase also occurs (described in more detail in the commonly-owned U.S. Pat. No. 7,898,734, which is herein incorporated by reference) in general inducing a change in ellipticity. For a bare aluminum reflection, it has been shown in U.S. Pat. No. 7,898,734 that the retardation associated with a facet is much more significant than diattenuation for the angles involved.

Figures 3, 4:
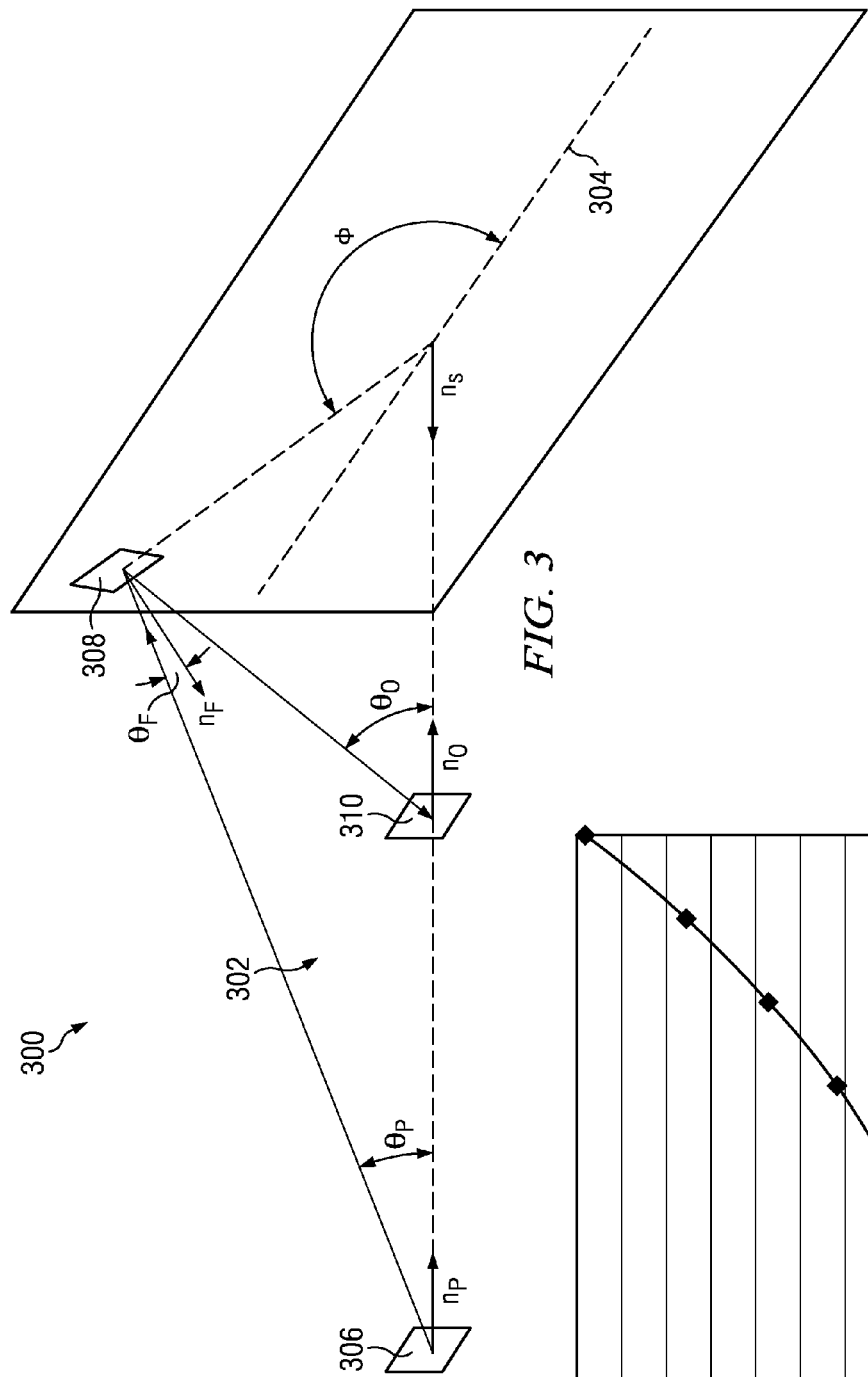
FIG. 3 illustrates a schematic diagram of an exemplary cinematic arrangement, in accordance with the present disclosure.
FIG. 4 illustrates a chart correlating the retardation as a function of facet incidence angle, in accordance with the present disclosure.

FIG. 3 is a schematic diagram showing an exemplary cinematic arrangement 300. The projection and observation vectors KP and KO define a facet coordinate system, which defines the facet plane of incidence 302. The local plane of incidence 302 forms an azimuth angle $\phi$ relative to the screen horizontal 304. For the simple geometry shown, the azimuth angle is common to all elements in the system, including the PPO 306, the facet 308, and the VPO 310. If it is considered that the facet 308 behaves primarily as a pure retarder, the fast and slow axes follow the azimuth, and therefore the facet 308 would have the behavior of a C-plate. For an aluminum mirror, the phase delay associated with the P-polarization is in general larger than that for the S-polarization, giving the facet a +C-plate retardation off normal. However, for most cinema environments these retardation values are small.

FIG. 4 is a chart showing the retardation at 550 nm (green) in nm, as a function of facet incidence angle from air onto a specular aluminum coating. As the magnitude of the facet incidence angle increases, the change in the State of Polarization (SOP) on reflection from the metal surface tends to become greater, but is quite small for modest angles.

The distinction between the influence that the facet normal and the screen (substrate) normal have on performance is to be appreciated. Screen coating processes often obey the central limit theorem, giving facet slope probability distributions that are approximately Gaussian relative to substrate normal. The facets are typically uniformly distributed in azimuth, so the diffuser is not directional and is symmetric with respect to the substrate normal. For instance, a typical silver screen has a 20° half-power angle, independent of azimuth, meaning that the population density per solid angle of facets inclined at 10° to the substrate normal is approximately half of that in the plane of the substrate.

Referring back to FIG. 2, when the projection and observation vectors KP and KO are not symmetrically placed with respect to the substrate normal $n_s$, the facet normal $n_f$ has a tilted orientation, $\theta_s$. In a case of symmetrically increasing incidence/observation angles ($\theta_F$), with fixed facet angle normal to the substrate ($\theta_S=0$), the same (in-plane) population of facets 204 is involved in the scattering event regardless of angle. So to the extent that large angles do not result in shadowing or multiple scattering events, polarization change may be largely determined by Fresnel effects that increase with facet incidence angle, $\theta_F$. Brightness may remain fairly constant for a modest range in angles. Conversely, in a case in which projection and observation directions KP and KO are counter-propagating (retro-reflected), as the facet angle ($\theta_S$) increases, the facet incidence angle ($\theta_F$) may remain zero, but the population of facets 204 involved in the scattering event is constantly changing. The population density of facets 204 falls with $\theta_S$ (with resulting loss in brightness), but there are in general no Fresnel polarization shifts. The facet angle is highly relevant to the statistical probability of reflection, and thus observed brightness. But indirectly, it can also determine PCR, since leakage (the denominator term) is frequently "white" in angle space, while the image brightness (the numerator term) tends to follow the gain curve.

An aspect of the present disclosure pertains to the optimization of polarization control for a variety of PPO, VPO, and projection and viewing geometries. In some embodiments, performance optimization may be based on some assumptions about the projection and viewing environment. Since environments are not standardized, even in the context of digital cinema, a single compensation solution cannot be optimum for the front-projection ensemble. But specifically in a cinema environment, there is a set of reasonable assumptions that may be applied, either in part or in whole, for optimization design:

1. The projector is centered horizontally with respect to the screen.
2. The projector is in a vertical position that is in general higher than any viewing location. In a cinema environment, the projector is typically higher than the screen center, and can even be located at/above the top of the screen.
3. The vector normal to the PPO is pointed at the screen center. This may be done to ensure that the highest performance is measured at screen center, ideally falling symmetrically (and gradually) as the angle increases. This assumption is based on the likely scenario that performance of the PPO is typically optimum at normal incidence.
4. Performance may be theoretically optimized for a single location in observation space, known as the "ideal viewer" (IV). In general, the location of the IV is constrained to be centered horizontally. The assumption again may be that performance of a passively compensated system will fall equally for viewers equidistant and on either side of the IV. The IV is also constrained in space by the particular auditorium geometry. In order for a single compensation scheme to be effective in virtually any theatre auditorium, the IV may further incorporate statistical analysis of theatre geometries, including, e.g., ensemble average viewer height and distance from the screen (as a percent of throw distance).
5. In an embodiment, selection of the IV can further incorporate nonlinearity in the functional decay in performance for observers within a particular radius of the IV. This can be useful for maximizing the quality of the experience for as large a population surrounding the IV as possible. A performance "Q-factor" can be assessed for each viewing location, with the IV associated with the center of mass. Conversely, in an embodiment, some weighting to the selection of the IV can also be given to achieving a just-acceptable-experience for viewers in extreme locations of the viewing space. In other words, optimization may not allow any "seat kills" associated with an unacceptable viewing experience.
6. In an embodiment, passive compensation may not optimize for general viewing direction, and it may be done for the specific case in which the viewer gazes at the screen center. In other words, the vector normal to the VPO is pointed at the center of the screen. As such, the IV assesses performance with greatest resolution/sensitivity based on a zone centered on the screen, with the perception of loss in performance based on observing other portions of the screen in the periphery (i.e., without head movement). In an embodiment, performance could also be optimized for situations where the viewer turns to look directly at features on the screen, which may be useful for applications that represent information to viewers, such as, medical imaging, aviation cockpit displays, etc.
7. Embodiments may correct global polarization issues by compensating at the projector. That is, a compensation stack placed at the projector can optimize the experience for the IV by correcting the polarization associated with the deterministic polarization factors (e.g., Factors 1 through 4) listed above. In so doing, the eyewear need not be modified to optimize performance, thus minimizing overall cost. Moreover, certain compensation materials and configurations may not be practical for roll-to-roll, or other commodity manufacturing processes.
8. Embodiments may include screen curvature, typically a curvature of the screen about the vertical, ideally with radius of curvature equal to the throw distance (z).

In some embodiments, compensation for horizontal offset (i.e., displacement of viewer location from the plane containing the projector and screen center) may be configured in a symmetric fashion. For instance, it may not be beneficial to improve the experience for viewers to the left of center, if it is at the expense of those to the right of center. Accordingly, compensation for horizontal offset may be achieved using elements that possess the symmetry to improve the experience both to the left and right of center. The details depend upon the details of the projection and eyewear polarization optics.

Figure 5:
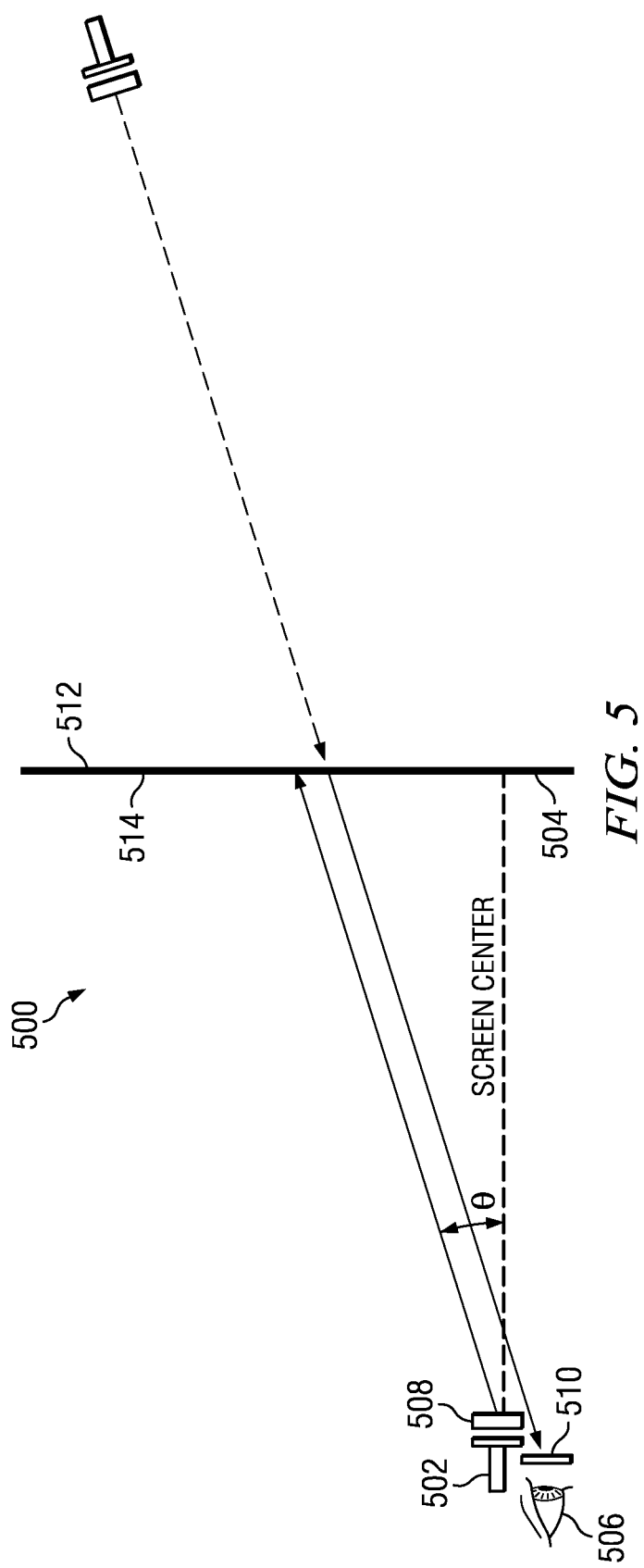
FIG. 5 illustrates a 2D cross-sectional schematic diagram of an exemplary theatre auditorium, in accordance with the present disclosure.

FIG. 5 is a schematic diagram illustrating a simplified 2D cross section of an exemplary theatre auditorium 500, in which the plane of the diagram includes the projector 502 and screen center 504. While it is an unlikely front projection arrangement for the projector 502 and the viewer 506 to be co-located, it is useful for illustrative purposes. Due to the co-location of the projector 502 and the viewer 506, the normal vectors (not shown) of the PPO 508 and the VPO 510 do not have any vertical offset. For an arbitrary projection vector, the light probes the screen surface 514 for facets (not shown) that produce a retro-reflected ray. As such, light is in general normally incident on every facet that is operable to provide light to the viewer 506, and the screen 512 therefore has no impact on the SOP. This arrangement is equivalent to reflecting the projector location about the facet plane, as shown in FIG. 5. In this unfolded arrangement, the azimuth angle and incidence angle θ through the PPO 508 are equivalent to that through the VPO 510, thus eliminating issues associated with differential incidence angle between the projection vector and viewing vector. In effect, the compensation configuration for the geometry in theatre 500 may be designed by considering the VPO 510 and PPO 508 as a single stack and minimizing the impact of incidence angle on overall performance metrics, as outlined above in accordance with the principles of the present disclosure. Such compensation schemes are described in the commonly-owned U.S. patent application Ser. No. 13/010,755, which is incorporated by reference herein.

The following examples are based on optimization for co-location of projector and viewer for 3D systems of the present disclosure.

Example 1A

Figure 6A:
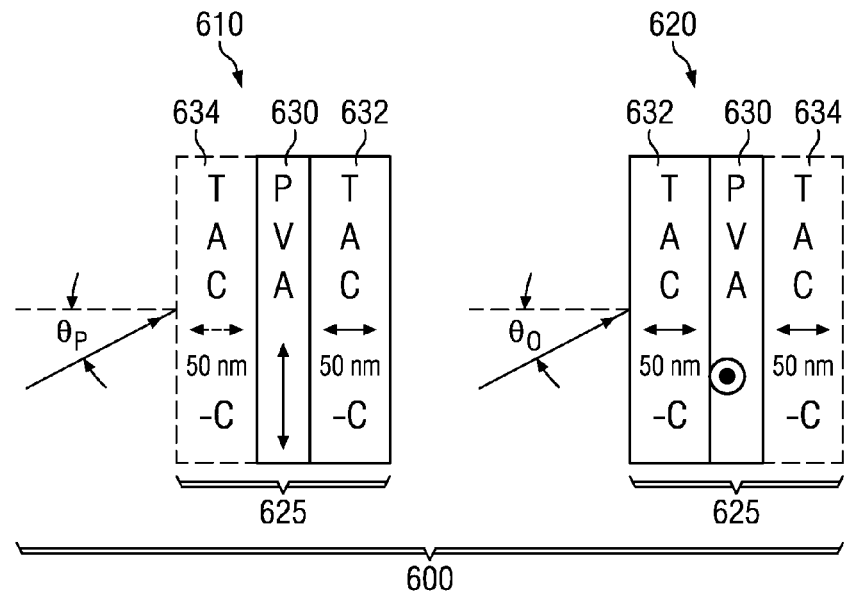
FIG. 6A illustrates a schematic diagram of an uncompensated stereoscopic system, in accordance with the present disclosure.
Figure 6B:
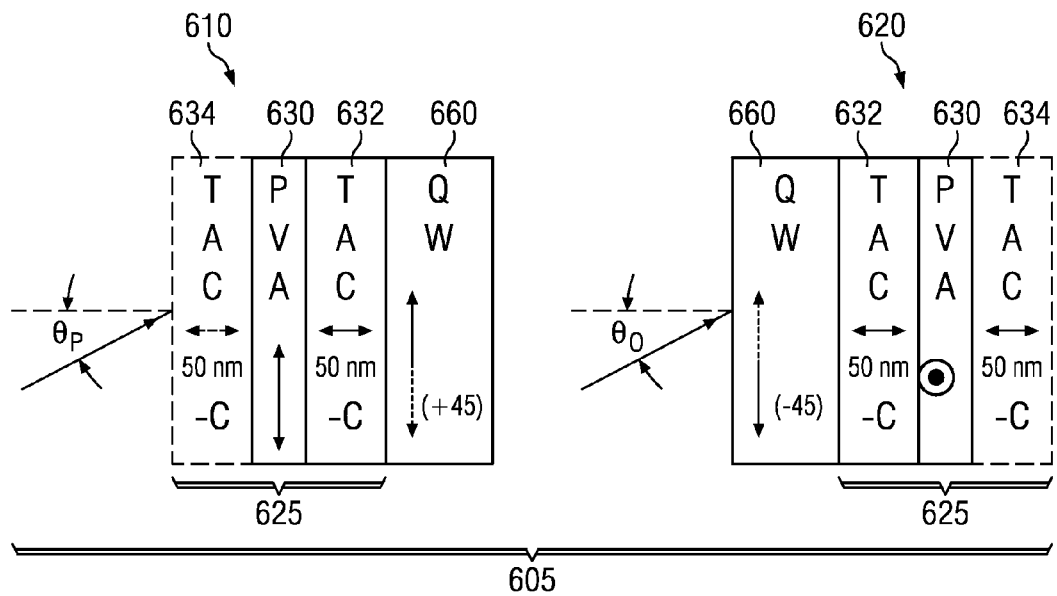
FIG. 6B illustrates a schematic diagram of an uncompensated circular stereoscopic system, in accordance with the present disclosure.

FIG. 6A is a schematic diagram showing a stereoscopic system 600. FIG. 6B is a schematic diagram showing a circular polarization stereoscopic system 605, which will be described in greater details below. The stereoscopic system 600 may include an image source subsystem 610 operable to output light of first and second states of polarization (e.g., S- and P-polarization) and an analyzer subsystem 620. The analyzer subsystem 620 may include eyewear operable to substantially block light of the first state of polarization from traveling along a first path (e.g., light path to a first eye) and to substantially block light of the second state of polarization from traveling along a second path (e.g., light path to a second eye). In an embodiment, the image source subsystem 610 may include a first optical element operable to cause a first polarization change on light passing therethrough, and the analyzer subsystem 620 may include a second optical element operable to cause a second polarization change, in which the first and second polarization changes, if not compensated, would cause at least one of a leakage of light of the first SOP along the first path or a leakage of light of the second SOP along the second path.

For example, the PPO 610 and VPO 620 may each include a polarizer 625 comprising a functional PVA polarizer film 630 laminated between triacetate cellulose (TAC) films 632, 634, 625. In an embodiment, the polarizer films 630 of PPO 610 and VPO 620 may be substantially identical, and the polarizer orientation and polarizing efficiency may thus be considered ideal. But TAC films 632, 634 may not be isotropic and may behave as a −C-Plate, which may be understood to be a negative uniaxial retarder with optic axis oriented normal to the film. In the $\phi=\pm 45°$ azimuth, this retardation has the greatest impact, further degrading the PCR. Assuming a retardation of −50 nm of −C-plate retardation for each substrate (combined −100 nm), the contrast in the $\phi=\pm 45°$ azimuth degrades to 100:1 at 33°, and 50:1 at 40°. Further, at an angle of 75°, the contrast is only 10:1.

Figure 7A:
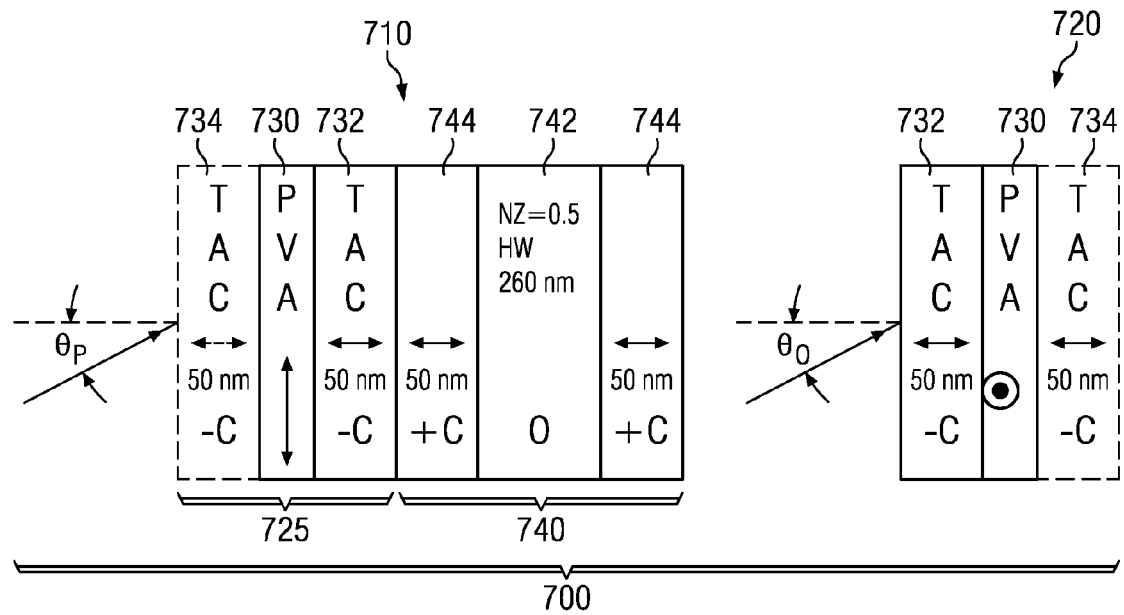
FIG. 7A illustrates a schematic diagram of a first exemplary compensated stereoscopic system, in accordance with the present disclosure.

FIG. 7A is a schematic diagram showing an exemplary embodiment of a compensated stereoscopic system 700, in accordance with the disclosed principles. The compensated stereoscopic system 700 may include an image source subsystem 710 operable to output light of first and second states of polarization (e.g., S- and P-polarization) and an analyzer subsystem 720. The analyzer subsystem 720 may include eyewear operable to substantially block light of the first state of polarization from traveling along a first path (e.g., light path to a first eye) and to substantially block light of the second state of polarization from traveling along a second path (e.g., light path to a second eye). Like the image source subsystem 610 and analyzer subsystem 620, in an embodiment, the image source subsystem 710 may include a first optical element operable to cause a first polarization change on light passing therethrough, and the analyzer subsystem 720 may include a second optical element operable to cause a second polarization change, in which the first and second polarization changes, if not compensated, would cause at least one of a leakage of light of the first SOP along the first path or a leakage of light of the second SOP along the second path. In the illustrated embodiment, the first and second optical elements may each include a polarizer 725 similar to polarizers 625 in FIGS. 6A & 6B and includes a PVA polarizer film 730 laminated between TAC films 732, 734. It is to be appreciated that while the external TAC 734 are shown, they have little to no impact on the SOP. To compensate for the first and second polarization changes induced by the polarizers 725 of the image source subsystem 710 and the analyzer subsystem 720, a compensator 740 may be included in the stereoscopic system 700. The compensator 740 may be disposed in either the image source subsystem 710 or the analyzer subsystem 720, and may be configured to at least reduce both the first and second polarization changes.

In FIG. 7A, the image source subsystem 710 includes the compensator 740, which may include a biaxial half-wave retarder 742 oriented parallel/perpendicular to the absorption axis, with Nz=0.5. An aspect of the biaxiality is that the optic axis remains stable in the 45° azimuth when illuminated off-normal. Conversely, the polarizer absorption axes are counter-rotating in this azimuth. As such, the biaxial half-wave retarder optimally reflects the SOP of the input polarization about an optic axis, correctly orienting it along the analyzer absorption axis. Using a zero-order half-wave retarder in the green, the photopic polarization contrast remains above 1,000:1 for incidence angles above 60°. By placing the compensator 740 in the imaging source subsystem 710, the compensator 740 is operable to substantially compensate for contrast loss experienced by all viewers.

Example 1B

Figure 7B:
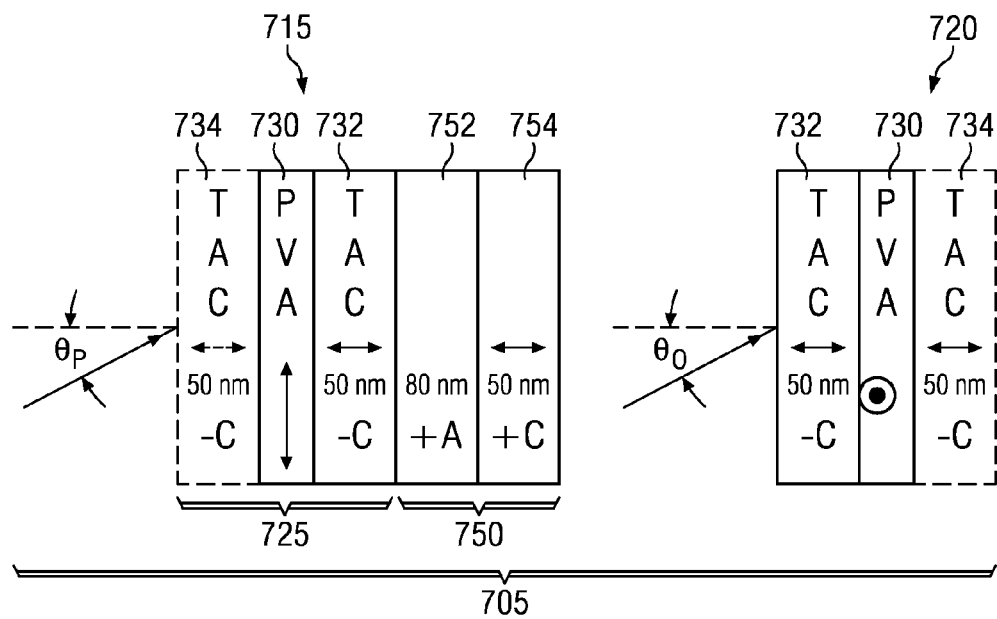
FIG. 7B illustrates a schematic diagram of a second exemplary compensated stereoscopic system, in accordance with the present disclosure.

FIG. 7B illustrates an embodiment of a compensated stereoscopic system 705, also in accordance with the disclosed principles. The stereoscopic system 705 is similar to stereoscopic system 700 except the stereoscopic system 705 includes a compensator 750 instead of the compensator 740. In an embodiment, the compensator 750 includes an A-plate 752 and C-plate 754 as an alternative to the biaxial retarder 742 in the compensator 740. The A-plate 752 may be a positive A-plate with 80 nm of retardation and have its slow-axis crossed with respect to the absorption axis of the polarizer 730. The A-plate 752 may be followed by a positive C-plate 754 with a retardation of 150 nm. The action of this combination may be sufficient to compensate both for the retardation of the TAC layers 732 and the geometrical rotation of the crossed polarizers 730. Using this compensation configuration, the PCR may remain above 660:1 for incidence angles above 75°.

Example 2A

FIG. 6B is a schematic diagram showing a stereoscopic system 605, which is similar to stereoscopic system 600 except the image source subsystem 610 and the analyzer subsystem 620 of the stereoscopic system 605 each include a quarter-wave retarder 660. The quarter-wave retarder 660 allows for a circular polarization based 3D system, which is very common today. In the off-state, the quarter-wave retarder 660 of the image source subsystem 610 is crossed with the quarter wave retarder 660 of the analyzer subsystem 620. The crossed quarter-wave retarders 660, which may be considered as crossed +A-plates, behave similarly to −C-plates in the $\phi=45°$ azimuth, thereby adding additional retardation that further degrades contrast. An uncompensated circular-polarizer system similar to stereoscopic system 605, which includes TAC layers 632, may have a contrast of 100:1 at an incidence angle of 23°. The contrast may fall to 50:1 at 27°. Further, at an angle of 75°, the contrast may be less than 3:1.

FIG. 8A is a schematic diagram showing an exemplary embodiment of a compensated circular stereoscopic system 800. The compensated circular stereoscopic system 800 may include an image source subsystem 810 operable to output light of first and second states of polarization (e.g., S- and P-polarization) and an analyzer subsystem 820. In the illustrated embodiment, the image source subsystem 810 and the analyzer subsystem 820 may each include a polarizer 825 having a PVA polarizer film 830 laminated between TAC films 832, 834. The image source subsystem 810 and the analyzer subsystem 820 may also include quarter-wave retarders 860, 865, respectively. To compensate for the polarization changes induced by the quarter-wave retarders 860, 865 and polarizers 825 of the image source subsystem 810 and the analyzer subsystem 820, a compensator 840 may be included in the circular stereoscopic system 800. The compensator 840 may be disposed in either the image source subsystem 810 or the analyzer subsystem 820. In the illustrated embodiment, the compensator 840 is disposed in the image source subsystem 810 following optically the polarizer 825. As illustrated, the compensator 840 may include a TAC compensator 843 followed by a biaxial half-wave retarder 844. In order to compensate for the crossed +A-plates (i.e., the quarter wave retarders 860, 865) and the polarizer 825 at the analyzer subsystem 820, the compensator 840 further includes +C-plates 844 sandwiching the quarter-wave retarder 860. By increasing the +C-plate retardation (e.g., from 50 to 92 nm in the illustrated embodiment), the contrast of the system may be maintained above 1,000:1 for angles exceeding 60°.

Example 2B

FIG. 8B illustrates another embodiment of a compensated circular polarization stereoscopic system 805, in accordance with the disclosed principles. The circular polarization stereoscopic system 805 is similar to the circular polarization stereoscopic system 800, except the stereoscopic system 805 includes a compensator 850 instead of the compensator 840. In an embodiment, the compensator 850 includes an A-plate 852 and C-plate 854 as an alternative to the biaxial retarder 842 in the compensator 840. The A-plate 852 may be a positive A-plate with 80 nm of retardation and have its slow-axis crossed with respect to the absorption axis of the polarizer 830. The A-plate 852 may be followed by a positive C-plate 854 with a retardation of 200 nm. To further improve contrast, a second positive C-plate 854 with a retardation of 80 nm is added after the quarter-wave retarder (+A-plate) 860. The action of this combination may be sufficient to compensate both for the retardation of the TAC layers 832, the retardation of the crossed quarter wave retarders 860, 865, and the geometrical rotation of the crossed polarizers 830. Using this compensation configuration, the PCR may remain above 1000:1 for incidence angles above 75°.

The above examples include optimized exemplary embodiments for maximizing contrast over the full field of view to large angles. However, it is to be appreciated that portions of the disclosed compensators 740, 750, 840, and 850 can be used to enhance performance relative to uncompensated systems 600 and 605. For instance, the exit +C-plate retarder 744, 754, 844, and 854 used in the above example may be omitted while still yielding performance that is substantially better than an uncompensated system.

In many eyewear lens constructions, there are additional retarders, or retarders that do not possess ideal anisotropy, and improved performance may be achieved with adjustment in compensation. Two examples of this are provided here to illustrate the application of the principles of the present disclosure.

In an embodiment, low-cost cinema eyewear may contain flat die-cut lenses having the elements of the analyzer subsystem 620 as shown in FIGS. 6A & 6B. While the polarization performance of such a lens can be nearly ideal, the optical properties can be quite poor (e.g., transmitted wavefront distortion, and in particular irregularity). For circular polarization eyewear, a linear polarizer is laminated to a quarter-wave retarder using a pressure-sensitive adhesive, further exacerbating the problem. In an exemplary embodiment, to counteract this, polarizing sunglass lens fabrication techniques can be applied. Techniques such as insert-molding, injection molding on the lens back-side, thermo-forming incorporating press-polishing, and thermoforming stack-ups involving additional substrates (e.g., acrylic) may be used to improve mechanical support and optical quality. However, such processes may compromise polarization control, including the uniformity of polarization control. An addition of foreign materials with mechanical properties that are not matched, stresses from adhesives, and stresses from pressure/heat of forming processes tend to negatively affect polarization properties. In cases where the manufacturing process results in a deterministic effect, compensators configured according to the principles of the present disclosure may be incorporated into the eyewear to improve the situation.

In some embodiments, in higher optical quality 3D eyewear, the retarder material used for the circular polarizer may be selected for formability, but it may not be ideal from a polarization control standpoint. Lenses may include retardation film with high intrinsic retardation, or retardation resulting from biaxial stretching. Examples include cellulose acetate propionate (CAP), and cellulose diacetate (DAC), and stretched films with engineered biaxiality. CAP and DAC, like TAC, possess negative intrinsic (C-plate) retardation, but to a much larger degree. A typical DAC/CAP quarter-wave retarder may have 200 nm (or more) of −C-plate retardation. To the extent that the eyewear retardation is consistent, compensators designed according to the principles of the present disclosure may be incorporated in the imaging source subsystem to effectively reduce the intrinsic retardation of CAP and DAC for all viewers. For instance, the retardation of the +C-plate retarder 854 of FIG. 8B may be increased appropriately to compensate for any negative intrinsic retardation associated with the analyzing the quarter wave.

Similar polarization control degradation may exist if a substrate is laminated external to a uniaxial quarter-wave retarder. If a substrate is required to provide mechanical support or improve optical characteristics, it ideally may be isotropic. However, there are few substrates that may be manufactured with low in-plane retardation (ideally <3 nm) and be thermoformable without introducing in-plane retardation. TAC is one such substrate, but depending on the design thickness, it may introduce significant additional C-plate retardation. As discussed above, such retardation may be compensated by a suitable adjustment in retardation values of the compensator at the projector or eyewear.

Figure 9:
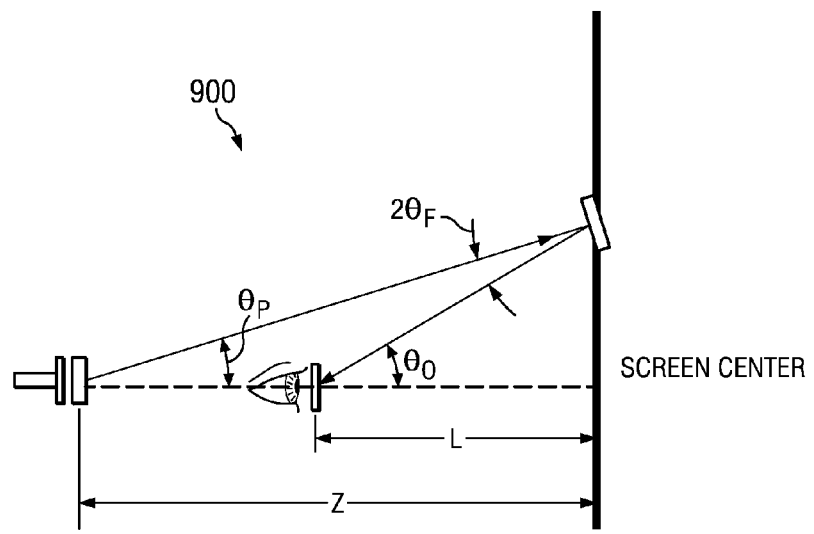
FIG. 9 illustrates a schematic diagram of an exemplary model of a cinema configuration in accordance with the present disclosure.
Figure 10:
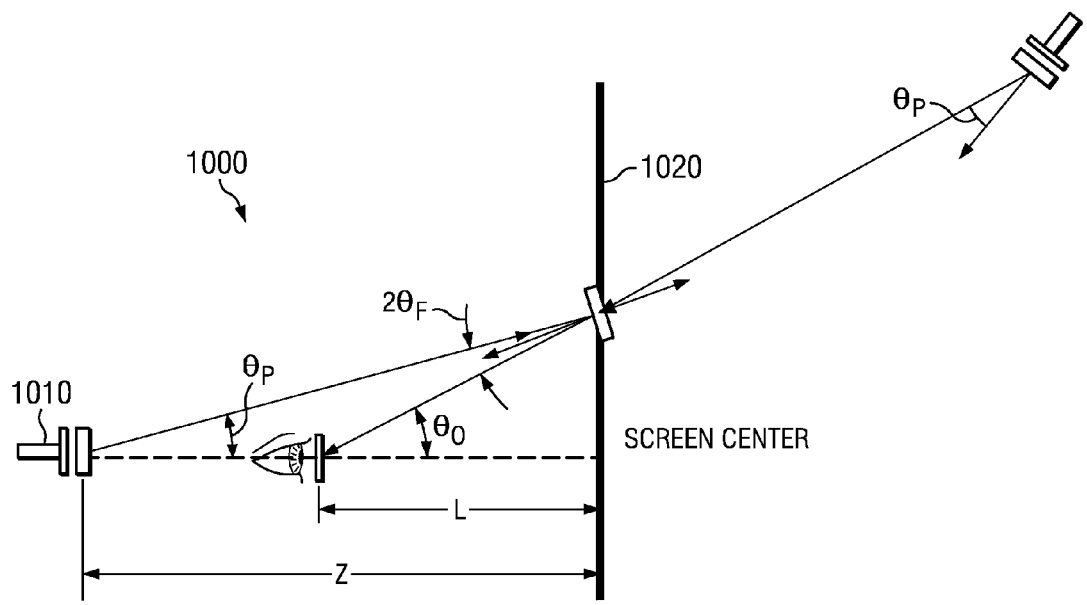
FIG. 10 illustrates a schematic diagram of the exemplary model of the cinema of FIG. 9, with light paths unfolded across a facet plane, in accordance with the present disclosure.

FIG. 9 illustrates a configuration 900 more representative of the typical cinema configuration. FIG. 10 illustrates a configuration 1000 having an unfolded optical path, based on reflection of the projector 1010 about the facet plane in the configuration 900 shown in FIG. 9. As described in the above discussed '381 patent application, further adjustment in compensation may be made to account for differences between projector and observer incidence angles. In the embodiment illustrated in FIG. 9, the viewer is moved toward the screen along the normal direction, with a center-screen viewing distance, L. In this case, the screen has the effect of decoupling the projection angles from the viewing angles, such that the projector and observer incidence angles may be determined according to equation (1):

$$\theta_O = \tan^{-1}[(Z/L)\tan\theta_P] \qquad (1)$$

Also, the facet incidence angle is in general no longer zero and is related to the projector and observer angles by equation (2):

$$(2) \qquad \theta_F = (\theta_O - \theta_P)/2$$

Due to the symmetry of the arrangement, the above relationships are independent of azimuth.

In an embodiment, an observer may be positioned midway between the projector 1010 and screen 1020. In such an embodiment, according to equations 1 and 2, if the maximum projection angle is 20°, the maximum viewing angle is 36°, and the maximum facet angle is 8°. In a more challenging scenario, if the maximum projection angle is 30°, the maximum viewing angle is 49°, and the maximum facet angle is 9.6°. This example shows that the observer angles are by far steeper, while the Fresnel contribution to polarization change is relatively small due to the small facet angles. As FIG. 2 shows, the retardation associated with the facet at 10° is approximately 1 nm, allowing it to be disregarded from the compensation scheme in some embodiments.

Because the angles through the VPO are in general larger than those through the PPO, the contribution to polarization error is magnified. It is desirable in some embodiments to accomplish all compensation at the projector, but because the angles are smaller, adjustments may be made to optimally compensate for the angle differential. Specific exemplary embodiments of PPO/VPO optics configurations according to the present disclosure are provided below.

The exemplary embodiments in FIGS. 7A, 7B, 8A, and 8B were analyzed using rigorous 4×4 Berreman matrix methods, which included both the effect of geometrical rotation of elements such as the polarizers, as well as retardation shift, under the condition of a common incidence angle. For the following embodiments, a simplified analysis is done that examines the effect of retardation shift in isolation. The analysis is performed in the worst-case azimuth of $\phi = \pm 45°$ assuming the relationship between the VPO and PPO angles given above. In some sense, these issues are separable, in that the geometrical correction from the biaxial half-wave retarder and its equivalents (e.g., combination of +A-plate and +C-plate) is independent of the correction for retardation error. Geometrical errors in the optic axis orientation (e.g., for a circular polarizer based system) do not exist in the $\phi = \pm 45°$ azimuth.

Example 3

Turning back to FIG. 7A, in an embodiment, the compensator 740 may include +C-plates 744 sandwiching the retarder 742 to compensate for the polarization changes of both polarizers 725 and optimize contrast. The net retardation of the system is given by equation (3):

$$\Gamma_{NET} = \Gamma_{TAC}(\theta_P, \pm 45°) + \Gamma_{COMP}(\theta_P, \pm 45°) + \Gamma_{TAC}(\theta_O, \pm 45°) \quad (3)$$

In a prior discussed embodiment, the objective may be to minimize the retardation for the IV, while insuring that it is within an acceptable range for the extreme cases. The optimization for this embodiment focuses on the extreme projection angles, which for a 1.0 throw ratio may be roughly $\theta_P = 30°$. The compensation may be selected so as to maximize contrast at the extreme angle, while insuring that it does not dip below that value for smaller projection angles.

The retardation of a C-plate, which is independent of azimuth angle, may be given by equation (4):

$$\Gamma_c(\theta, \gamma) = k n_o d [\sqrt{(1-(\sin\theta/n_e)^2)} - \sqrt{(1-(\sin\theta/n_o)^2)}] \quad (4)$$

In equation (4), $n_o$ and $n_e$ are the ordinary and extraordinary indices of refraction, respectively, k is the vacuum wave number ($k = 2\pi/\lambda$, where $\lambda$ is the vacuum wavelength), d is the retarder thickness, and $\theta$ is the angle of incidence in air. For TAC, indices of 1.47 and 1.46 are used respectively for $n_o$ and $n_e$ for modeling purposes, where $k(n_e - n_o)d = -50$ nm.

Figure 11:
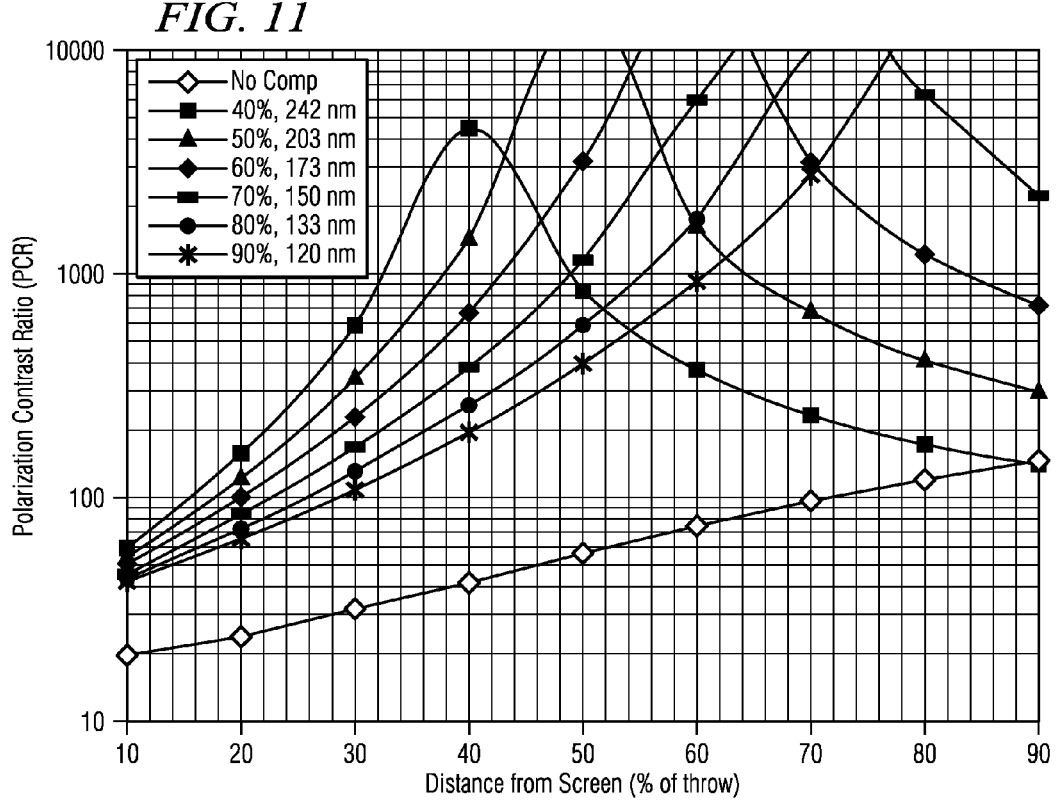
FIG. 11 illustrates a chart of a comparison of contrast ratios to projection angles for various minimum PCR value, in accordance with the present disclosure.

FIG. 11 illustrates contrast ratios over a full range of projection angles for various minimum PCR value. With a net −100 nm of TAC retardation between the PVA polarizers, and no compensation, the contrast is generally low, and falls monotonically as the viewer moves toward the screen. For example, the PCR is 57:1 for a viewer located at the 50% point (mid-way between projector and screen). If a +C-plate is added at the projector, according to the present disclosure, to compensate both TAC layers, with a retardation matched to the net −C-plate retardation (+100 nm), the system may be substantially fully compensated for viewing at 100% of the throw distance. For this example, when the index values of $n_o = 1.52$ and $n_e = 1.53$ are used for the compensator, the contrast is considerably better, but again falls monotonically as the viewer approaches the screen. For example, the PCR is a much improved 246:1 at the 50% viewing point under this compensation scheme.

When the +C-plate retardation value is increased according to the present disclosure to optimize the contrast for a particular IV distance, contrasts increase significantly. For example, FIG. 11 shows that if the IV is selected to be at the 50% viewing distance, the worst-case contrast can be maintained above 300:1 for viewers from below 30%, to those at 90%. The compensator retardation value desired at the projector is roughly twice that of the TAC retardation, in order to overcome the angle difference.

It is noteworthy that the peak PCR attainable decreases when the IV is moved closer to the screen. There is a relatively significant increase in PCR for all viewing angles when a compensator is added that matches the TAC base retardation. But beyond that, the effectiveness of increased retardation for viewers very near the screen is limited. At the extreme 10% viewing distance, the difference between PCR for compensation optimized for the IV at 40% is not substantially better than that optimized for the IV at 90%. Given that there is a more gradual fall in PCR for viewers behind the IV, optimization based on maximizing the PCR improvement for all viewers may involve locating the IV to be at about approximately the 50% point.

Example 4

This example is identical to Example 3, except that crossed (+A-plate) quarter wave retarders are inserted between the linear polarizers, oriented at ±45°, representative of a circular-polarization based system, similar to the circular stereoscopic systems 800 or 805 discussed above. The net retardation after the addition of these retarders may be determined using equation (5):

$$\Gamma_{NET} = \Gamma_{TAC}(\theta_P, \pm 45°) + \Gamma_{QW}(\theta_P, \pm 45°) + \Gamma_{COMP}(\theta_P, \pm 45°) + \Gamma_{QW}(\theta_O, \pm 45°) \pm \Gamma_{TAC}(\theta_O, \pm 45°) \quad (5)$$

The retardation of an +A-plate retarder is given by equation (6):

$$\Gamma_{QW}(\theta, \phi) = k d [n_e \sqrt{(1-(\sin\theta/(n_e(\phi))^2)} - n_o \sqrt{(1-(\sin\theta/n_o)^2)}] \quad (6)$$

where, $$1/n_e^2(\phi) = [\cos^2(\phi)/n_e^2] + [\sin^2(\phi)/n_o^2]$$

The above is given in the rotated coordinate system associated with the retarder, where $\phi = \phi - 45°$. As before, the present analysis is performed at the net retardation in the (worst-case) $\phi = \pm 45°$ azimuth. Relative to the previous linear polarizer case, the additional retardation associated with the crossed quarter-wave retarders is given by equation (7):

$$\Gamma_{QWNET}(\theta, 45°) = k d [n_e \sqrt{(1-((\sin\theta_P)/n_o)^2)} - n_o \sqrt{(1-((\sin\theta_P)/n_o)^2)} - n_e \sqrt{(1-((\sin\theta_O)/n_e)^2)} + n_o \sqrt{(1-((\sin\theta_O)/n_o)^2)}] \quad (7)$$

In the case where the IV is located at the projector, this retardation is determined by equation (8):

$$\Gamma_{CAP} = k\, n_e d [\sqrt{1-(\sin\theta/n_e)^2} - \sqrt{1-(\sin\theta/n_o)^2}] \quad (8)$$

This shows that the retardation of crossed +A-plates in the φ=±45° azimuth has the same functional form as the above −C-plate retarder, with Z-retardation given by the in-plane retardation of a single A-plate. As such, quarter-wave retarders add additional −C-plate retardation, which may use further compensation accomplished at the projector in some embodiments.

FIG. 12 shows contrast ratios over a full range of projection angles for various minimum PCR value in a circular polarizer system. The parameters are the same as for Example 3, with the quarter-wave parameters given by $n_o$=1.52 and $n_e$=1.53. The quarter wave thickness (d) is selected to give a retardation of 129 nm at a wavelength of 516 nm. To compensate for the 100% viewing distance (common projection and viewing angles), a +C-plate with 229 nm of retardation may thus be used. This substantially improves PCR. But as before, additional compensation improves the PCR as the viewer is moved further toward the screen.

In general, the peak contrast attainable with the circular system when optimized for a particular IV location is lower than that possible with the linear case. For example, a system optimized for the IV at 50% maintains a contrast about approximately 60:1 from the 30% viewing position to the 90% viewing position. As before, the retardation used at the projector increases as the IV moves closer to the screen; so a system optimized for 50% has a retardation that is nearly twice that for 100% viewing.

Cinema auditoriums typically have other geometrical factors that can influence polarization maintenance. This includes screen curvature, vertical offset of projector and vertical offset of viewing. These factors can be reduced to incidence angle and azimuth angles for the three components that define system performance, as shown in FIG. 1.

Screens may be curved in a cylinder about the vertical, with a radius of curvature matched to the throw distance. At the projector height, the throw distance is constant in the horizontal, and the substrate normal vector coincides with the projection vector. This means that deviation between projection and screen normal only occurs in the vertical direction, which may suppress brightness nonuniformity. In principle, a screen can have compound curvature, which can match projection and screen normal vectors for all positions, but this concept has never enjoyed much popularity.

A flat screen can be compared to a curved screen with identical chord width, W. For a projector centered on the screen, the maximum projection angle may be determined by equation (9):

$$\tan\theta_P = [\sqrt{(1+(H/W)^2)}]/2T \quad (9)$$

In equation (9), H is the screen height, W is the screen width, and T is the throw ratio. Because the throw distance grows with angle off screen normal, the projection angle is diminished. So a throw ratio of T=1, and a screen aspect ratio of W/H=2 gives a maximum projection angle of 29°.

A curved screen has maximum projection angle that may be determined by equation (10):

$$\sin\theta_P = \sqrt{[(1+(H/W)^2)/(1+(2Z/H)^2)]} \quad (10)$$

For the above conditions, equation (10) yields a larger 33° maximum projection angle.

FIG. 13 is a side view of a projection configuration 1300 having vertical offset on the incidence angles. Vertical offset may create asymmetry/directionality in the polarization map.

The projector vertical offset in a cinema may be a significant fraction of a half-screen, and at times the projector 1302 may be above the top of the screen 1304. The height of the viewer 1306 relative to screen center may be a function of distance from the screen 1304, in accordance with the slope of the stadium seating configuration in some embodiments.

FIG. 14 is a schematic diagram illustrating a stereoscopic system 1400 compensated for vertical offset in accordance with the disclosed principles. The virtual projector location is shown in FIG. 14 for the center and upper extreme ray to illustrate the unfolded geometry. Provided that the PPO and VPO normal vectors are oriented at screen center, and the effect of the facet on the SOP may be ignored, the contrast is identical to previous examples in which there is no vertical offset.

Also shown in FIG. 14 is the asymmetry in extreme angles caused by the offset. The vertical displacement between projector 1402 and viewer 1406 increases the projection and facet angles at the top of the screen 1404, and diminishes them at the bottom. Overall, there may be a facet "bias-angle" due to vertical offset. Recalling that the facet may behave as a +C-plate at screen center, the principle coordinates of the retarder are in-plane and normal to the figure. Any significant non-zero polarization shift can in principle be compensated according to the present disclosure. A planar compensator 1410 having the associated asymmetry may substantially eliminate facet retardation at all angles. In an embodiment, the compensator 1410 may comprise an O-plate (oblique), which may be implemented by appropriately tilting a C-plate or A-plate. FIG. 14 illustrates this, where tipping the C-plate compensator 1410 forward reduces the incidence angle for rays directed to the bottom of the screen 1404 (thus reducing compensation), and increases the incidence angle for rays directed to the top of the screen 1404 (thus increasing compensation). The retardation and tilt-angle are likely selected to eliminate facet retardation at screen center.

Though not optimum, compensation can also be accomplished using other schemes. For instance, in an embodiment, the in-plane retardation may be reduced using a crossed A-plate, which under-compensates the top of the screen and over-compensates the bottom. To the extent that compensation can be accomplished by appropriate tilting of portions or all of the existing PPO structure, and/or adjustment to the retardation of an existing component, there is no need for an additional compensator.

It is to be appreciated that although some embodiments and examples of the present disclosure may refer to particular illustrated projection or display systems, the exemplary compensation approaches disclosed herein may be suitable for improving the performance of any polarization based 3D system, including but not limited to single projector sequential (e.g., DLP), single projector spatial (e.g., SONY SXRD), dual projector, dual engine systems, and 3D displays, such as film patterned retarder (FPR) systems.

FIG. 15 is a schematic diagram showing an exemplary FPR system 1500. Some advantages of 3D displays based on FPR may include:
1. Low production cost;
2. Low cost eyewear;
3. Comfort due to light weight of passive eyewear used with FPR systems
4. Less orientation dependent; and
5. Flicker elimination.

As shown in FIG. 15, the FPR 3D system 1500 may include stripe patterned quarter wave plate (QWP) 1504, which may be made of liquid crystal polymer (LCP). The stripe patterned QWP 1504 may be aligned with LCD pixel stripes in the LCD panel 1502 in the horizontal direction. An image 1510 may be alternately displayed on these horizontal stripes 1502 as 3D left and right signals. The exiting light will be converted to left hand and right hand circular polarized light by the stripe patterned QWP 1504. The eyewear 1506 comprising left and right circular polarizer (CP) is operable to separate left image from right image, or vise versa, to allow a user 1516 to perceive a 3D image.

In an embodiment, the field of view (FOV) of a display may be a critical design factor. In an embodiment of the system 1500, the striped QWP 1504 and the QWP in the eyewear 1506 may both be made of uniaxial a-plate material (i.e., $n_x >= n_y = n_z$). Even if they are made of the identical material for dispersion matching, the system 1500 may still have a narrow field of view (FOV).

FIG. 16 is a polar plot of the contrast ratio of an FPR system similar to the FPR system 1500 of FIG. 15. The narrow field of view is indicated by the low contrast ratio at about 15:1 in the 45/135 degree azimuthal plane at 40 degree viewing angle, while the contrast ratio is much higher at smaller viewing angles.

FIG. 17 is a schematic diagram of a compensated FPR system 1700, in accordance with the disclosed principles. The FPR 3D system 1700 may include an image source subsystem 1750 comprising an LCD panel 1705, optically followed by an exit polarizer 1710, and a stripe patterned quarter wave plate (QWP) 1730. The FPR 3D system 1700 may also include an analyzer subsystem 1760 comprising eyewear 1740 having analyzing QWPs 1742 and polarizers 1744. The stripe patterned QWP 1730 may be aligned with LCD pixel stripes (not shown) in the LCD panel 1705 in the horizontal direction or vertical direction. To compensate for the above discussed low contrast and the narrow FOV, a half wave +C-plate 1720 may be disposed before the stripe patterned QWP 1730 at the display side as shown in FIG. 17.

FIG. 18 is a schematic diagram of another embodiment of a compensated FPR system 1800, in accordance with the disclosed principles. The FPR 3D system 1800 may include an image source subsystem 1850 comprising an LCD panel 1805, optically followed by an exit polarizer 1810, and a stripe patterned quarter wave plate (QWP) 1830. The FPR 3D system 1800 may also include an analyzer subsystem 1860 comprising eyewear 1840 having analyzing QWPs 1842 and polarizers 1844. A half wave +C-plate 1820 may be disposed after the QWPs 1742 on the eyewear 1840 side, in accordance with the principles disclosed herein for providing compensation.

FIG. 19 is a polar plot of contrast ratio for an FPR system compensated according to the disclosed configuration of a compensated FPR system 1700 or 1800. As illustrated, the addition of the +C-plate 1720 or 1820 has led to significant improvement in off-angle contrast.

FIG. 20A is a schematic diagram of a passive dual-projection stereoscopic system 2000, similar to the dual projection passive XL 3D system developed by RealD Inc. of Beverly Hills, Calif., which is also the Assignee of the present disclosure. The dual projection system 2000 comprises left and right projectors 2010 operable to provide left- and right-eye images, respectively. The dual projection system 2000 further comprises passive polarization units 2020 for polarizing the left- and right-eye images to substantially orthogonal polarizations. The polarized left- and right-eye images are then projected onto the polarization preserving screen 2030 for a viewer (not shown) to observe. The viewer may use analyzing eyewear (not shown) to separate the left- and right-eye images based on the orthogonal polarizations of the stereoscopic images. It is to be appreciated that the model 100 in FIG. 1 may be used to model the combination of the left projector 2010, the left polarization unit 2020, and the screen 2030, and the combination of the right projector 2010, the right polarization unit 2020, and the screen 2030. As such, the embodiments of compensation configurations disclosed herein may each be incorporated into the system 2000.

FIG. 20B is a schematic diagram showing an exemplary embodiment of a compensation configuration of the present disclosure incorporated into the system 2000 of FIG. 20A. Specifically, FIG. 20B illustrates close up views of the passive polarization units 2020 illustrated in FIG. 20A, as well as the viewer worn eyewear 2060. In the illustrated embodiment, the compensation configuration may include a +C-plate 2040 disposed at least in one of the left or right polarization units 2020 to compensate for crossed quarter wave plates 2050 in the left or right polarization units 2020 and the corresponding lens of the eyewear 2060. The use of a +C-plate to compensate for crossed QWPs was described in detail above with respect to FIGS. 8A and 8B, and is fully applicable here for the system 2000. Further, in an embodiment, the same compensation configuration may be incorporated in both the left and right polarization units 2020, thereby providing a compensated dual projection system.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A stereoscopic imaging system, comprising:
    an image source subsystem operable to output light of first and second states of polarization (SOP);
    an analyzer subsystem operable to substantially block light of the first SOP from traveling along a first path, and to substantially block light of the second SOP from traveling along a second path;
    wherein the image source subsystem comprises a first optical element operable to cause a first polarization change on light passing therethrough, and the analyzer subsystem comprises a second optical element operable to cause a second polarization change on light passing therethrough, further wherein the first optical element comprises a polarizer and a quarter wave retarder, both of which optically follow an image source of the image source subsystem, further wherein the second optical element comprises a polarizer and a quarter wave retarder in the analyzer subsystem;

wherein the first and second polarization changes, if not compensated, would at least partially cause at least one of a leakage of light of the first SOP along the first path or a leakage of light of the second SOP along the second path; and wherein the image source subsystem or the analyzer subsystem comprises a compensator configured to at least reduce both the first and second polarization changes.

2. The stereoscopic imaging system of claim 1, wherein the image source subsystem comprises at least one projector, and the compensator is disposed in the image source subsystem optically following the at least one projector.

3. The stereoscopic imaging system of claim 1, wherein the first and second polarization changes each comprise a geometric rotation, and the compensator comprises a biaxially stretched retarder operable to substantially correct the geometric rotation.

4. The stereoscopic imaging system of claim 1, wherein the first and second polarization changes each comprise a geometric rotation, and the compensator comprises a +A-plate and a +C-plate operable to cooperate to substantially correct a combined geometric rotation of the first and second polarization changes.

5. The stereoscopic imaging system of claim 1, wherein the first and second polarization changes each comprise a −C-plate type retardation, and the compensator comprises at least one +C-plate operable to substantially correct a combined −C-plate type retardation of the first and second polarization changes.

6. The stereoscopic imaging system of claim 1, wherein the compensator is optimized for performance measurements for an ideal viewer centered horizontally with respect to screen center.

7. The stereoscopic imaging system of claim 6, wherein the compensator is optimized for baseline acceptable performance measurements for viewers in extreme locations of a viewing space with respect to the location of the ideal viewer.

8. The stereoscopic imaging system of claim 6, wherein the compensator is optimized for maximizing performance measurements for as large a population surrounding the ideal viewer as possible.

9. The stereoscopic imaging system of claim 1, wherein the image source subsystem comprises a sequentially or spatially modulated LCD panel operable to output light of the first and second states of polarization.

10. A stereoscopic projector system, comprising:
a projection subsystem operable to output light of first and second states of polarization (SOP);
an analyzer subsystem operable to substantially block light of the first SOP from traveling along a first path and to substantially block light of the second SOP from traveling along a second path;
wherein the projector subsystem comprises a first optical element operable to cause a first polarization change on light passing therethrough, and the analyzer subsystem comprises a second optical element operable to cause a second polarization change on light passing therethrough, wherein the first and second polarization changes, if not compensated, would at least partially cause at least one of a leakage of light of the first SOP along the first path or a leakage of light of the second SOP along the second path; and wherein the projector subsystem comprises a compensator configured to at least reduce both the first and second polarization changes.

11. The stereoscopic projection system of claim 10, wherein:
the projection subsystem comprises:
left and right projectors,
a second compensator, and
a third optical element operable to cause a third polarization change on light passing therethrough; and
the analyzer subsystem comprises a fourth optical element operable to cause a fourth polarization change on light passing therethrough;
wherein the first and third optical elements optically follow the left and right projectors, respectively, wherein the compensator and second compensator optically follow the left and right projectors, respectively;
wherein the first and second polarization changes, if not compensated, would at least partially cause the leakage of light of the first SOP along the first path, and the third and fourth polarization changes, if not compensated, would at least partially cause the leakage of light of the second SOP along the second path, and
wherein the second compensator is configured to at least reduce both the third and fourth polarization changes.

12. The stereoscopic projection system of claim 10, wherein a vertical offset between a projector of the projection subsystem and a viewer at least partially contributes to the first and second polarization changes, and the compensator is operable to at least partially correct the first and second polarization changes due to the vertical offset.

13. The stereoscopic projection system of claim 10, wherein the compensator comprises an O-plate.

14. The stereoscopic projection system of claim 10, wherein a difference between an incidence angle of a projector of the projection subsystem and an incidence angle of a viewer at least partially contributes to the first and second polarization changes, and the compensator is operable to at least correct the first and second polarization changes due to the difference.

15. A stereoscopic display system, comprising:
an image source subsystem operable to output light of first and second states of polarization (SOP), the image source subsystem comprising:
an LCD panel:
an exit polarizer optically following the LCD panel, and
a stripe patterned quarter wave plate (QWP) aligned with the LCD panel; and
an analyzer subsystem operable to substantially block light of the first SOP from traveling along a first path, and to substantially block light of the second SOP from traveling along a second path, the analyzer subsystem comprising analyzing quarter wave plates and polarizers each being operable to receive light from one of the analyzing quarter wave plates;
wherein a first +C-plate is either disposed in the image source subsystem between the exit polarizer and the stripe patterned QWP, or disposed in the analyzer subsystem optically following one of the analyzing quarter wave plates.

16. The stereoscopic display system of claim 15, further comprising a second +C-plate, wherein both the first and second +C-plate are disposed in the analyzer subsystem optically following the respective analyzing quarter wave plates, wherein the first and second +C-plate are operable to each compensate for a −C-plate type retardation caused by the respective analyzing quarter wave plates and the stripe patterned quarter wave plate.

17. The stereoscopic display system of claim 15, wherein the first +C-plate is disposed in the image source subsystem and is operable to substantially compensate for a −C-plate type retardation caused by the analyzing quarter wave plates and the stripe patterned quarter wave plate.

18. The stereoscopic display system of claim 15, further comprising at least one compensating element operable to substantially compensate a geometric rotation and a retardation caused by the exit polarizer of the image source subsystem and the polarizers of the analyzer subsystem.

* * * * *